US012109815B2

(12) United States Patent
Budraa

(10) Patent No.: US 12,109,815 B2
(45) Date of Patent: Oct. 8, 2024

(54) NOZZLE GEOMETRY FOR PRINTHEADS

(71) Applicant: Nasser Budraa, La Crescenta, CA (US)

(72) Inventor: Nasser Budraa, La Crescenta, CA (US)

(73) Assignee: Ricoh Company, Ltd., Tokyo (JP)

( * ) Notice: Subject to any disclaimer, the term of this patent is extended or adjusted under 35 U.S.C. 154(b) by 685 days.

(21) Appl. No.: 17/188,659

(22) Filed: Mar. 1, 2021

(65) Prior Publication Data

US 2021/0178759 A1 Jun. 17, 2021

Related U.S. Application Data

(63) Continuation-in-part of application No. 16/999,301, filed on Aug. 21, 2020, now Pat. No. 11,135,846, which is a continuation of application No. 16/353,844, filed on Mar. 14, 2019, now Pat. No. 10,773,522.

(51) Int. Cl.

*B41J 2/16* (2006.01)
*B41J 2/14* (2006.01)
*B41J 2/145* (2006.01)

(52) U.S. Cl.

CPC ............... *B41J 2/162* (2013.01); *B41J 2/145* (2013.01); *B41J 2/16* (2013.01); *B41J 2/161* (2013.01); *B41J 2/1433* (2013.01); *B41J 2002/14475* (2013.01); *Y10T 29/49401* (2015.01)

(58) Field of Classification Search

CPC ... Y10T 29/49401; B41J 2/145; B41J 2/1433; B41J 2/16; B41J 2/161; B41J 2/162; B41J 2002/14475; B41J 2/14274; B41J 2002/14362

See application file for complete search history.

(56) References Cited

U.S. PATENT DOCUMENTS 4,425,777 A 1/1984 Jeglinski
5,434,607 A * 7/1995 Keefe .................... B41J 2/1433 347/50
7,480,993 B2 1/2009 Takashima et al.

FOREIGN PATENT DOCUMENTS

JP 2006341551 A * 12/2006
JP 2009208379 A * 9/2009

(Continued)

OTHER PUBLICATIONS

Shen et al., "Manufacture of an Integrated Three-Dimensional Structure Nozzle Plate Using Microinjection Molding for a 1200-dpi Inkjet Printhead," in Journal of Microelectromechanical Systems, vol. 18, No. 1, pp. 52-63, Feb. 2009. (Year: 2009).*

(Continued)

*Primary Examiner* — A. Dexter Tugbang
(74) *Attorney, Agent, or Firm* — Duft & Bornsen, PC

(57) ABSTRACT

Systems, methods, and software for fabricating a printhead. In one embodiment, a system comprises at least one punch press configured to punch first nozzle holes in a first nozzle plate with a first punch, where each of the first nozzle holes includes a first converging section, and to punch second nozzle holes in a second nozzle plate with a second punch, where each of the second nozzle holes includes a second converging section. The system further comprises a bonding tool configured to bond the first nozzle plate to the second nozzle plate to form a nozzle plate stack, where the first nozzle holes and the second nozzle holes define nozzles of the printhead.

20 Claims, 28 Drawing Sheets

(56) References Cited

FOREIGN PATENT DOCUMENTS

| | | | |
|---|---|---|---|
| JP | 4529807 | B2 | 8/2010 |
| JP | 2012254552 | A | 12/2012 |

OTHER PUBLICATIONS

Machine Translation of Japanese Patent Publication, JP 2009-208379, Mar. 2008. (Year: 2024).*

* cited by examiner

NOZZLE GEOMETRY FOR PRINTHEADS

RELATED APPLICATIONS

This non-provisional patent application is a continuation-in-part of U.S. patent application Ser. No. 16/999,301 filed on Aug. 21, 2020, which is incorporated herein by reference.

TECHNICAL FIELD

The following disclosure relates to the field of printheads, and more particularly, to fabrication of printheads.

BACKGROUND

Image formation is a procedure whereby a digital image is recreated on a medium by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a "jetting channel", which includes the nozzle, a pressure chamber, and a mechanism for ejecting the print fluid from the pressure chamber and through the nozzle, which is typically a diaphragm that is driven by an actuator (e.g., a piezoelectric actuator). A printhead also includes a drive circuit that controls when each individual jetting channel fires based on image data. To jet from a jetting channel, the drive circuit provides a jetting pulse to the actuator, which causes the actuator to deform a wall of the pressure chamber via the diaphragm. The deformation of the pressure chamber creates pressure waves within the pressure chamber that eject a droplet of print fluid (e.g., ink) out of the nozzle. A drop emerging from the nozzle will extrude as a jet which necks down and breaks off from the print fluid remaining in the nozzle. In an ideal case, the jet will move towards the medium with surface tension forces pulling the liquid into a spherical droplet. The surface tension will also cause the print fluid still attached to the nozzle to be drawn back into the nozzle. After the initial break-off, the jet has a head containing most of the print fluid, and a ligament or tail that extends from the head. When detached, the ligament will start to merge into the head of the jet. Depending on the viscosity of the print fluid, jetting velocity, and other jetting characteristics, the ligament may not merge into the head before it reached the medium, which results in satellites that are undesirable.

SUMMARY

Embodiments described herein comprise a tool and methods for forming improved nozzle geometries for printheads. The nozzle shape creates an instability in the print fluid as it passes through the nozzle, which reduces the length of a ligament for a jet. In one embodiment, nozzles as described herein may have a shape that converges for a portion of the length of the nozzle, stays uniform for the next portion of the length, and then converges again. This shape causes the velocity of the print fluid to increase initially in the nozzle, to remain constant along a partial length of the nozzle, and then to increase again before being ejected out of the nozzle. In another embodiment, the nozzles may have a shape that converges for a portion of the length of the nozzle, and then converges again for the remaining portion of the length. These nozzle shapes act to create instability in the jet that is discharged from the nozzle. It is one effective means for interacting with the print fluid closest to its exit point from the printhead. As such, the nozzle acts as a way to affect the shape of the jet in a manner that is closest to the desired output. In the case of high viscosity print fluids, droplet formation is hampered by the viscosity and the surface tension of the print fluid being jetted. In jetting these types of print fluids, the jet becomes exceedingly long as the viscous forces dominate over inertial forces. A break-off of the jet from the rest of the print fluid in the nozzle occurs late and at a long distance from the orifice. Thus, the ligament of the jet may become exceedingly long, and does not merge into the head of the jet. The shape of the nozzles described herein creates a difference in speed of the print fluid, and causes an artificial instability within the jet. This instability accelerates the break-off time, and reduces the length of the ligament to form a more desirable droplet.

One embodiment comprises a method of fabricating a printhead. The method comprises punching first nozzle holes in a first nozzle plate with a first punch, where each of the first nozzle holes includes a first converging section. The method further comprises punching second nozzle holes in a second nozzle plate with a second punch, where each of the second nozzle holes includes a second converging section. The method further comprises bonding the first nozzle plate and the second nozzle plate to form a nozzle plate stack, where the first nozzle holes and the second nozzle holes define nozzles of the printhead.

In another embodiment, the first nozzle holes are punched from a first side through a second side of the first nozzle plate, and the method further comprises polishing the second side of the first nozzle plate to form a planar surface on the second side of the first nozzle plate prior to the bonding.

In another embodiment, the second nozzle holes are punched from a first side through a second side of the second nozzle plate forming extrusions around the second nozzle holes on the second side of the second nozzle plate, and the method further comprises polishing the second side of the second nozzle plate to remove a portion of the extrusions and leave surface features around the second nozzle holes that define orifices of the nozzles where a print fluid exits the nozzles.

In another embodiment, a first convergence angle of the first converging section is greater than a second convergence angle of the second converging section.

In another embodiment, a first convergence angle of the first converging section is less than a second convergence angle of the second converging section.

In another embodiment, each of the first nozzle holes in the first nozzle plate includes the first converging section, and a neck adjoining the first converging section having a diameter that is uniform.

In another embodiment, the second converging section converges from a first side to a second side of the second nozzle plate, and a diameter of the second converging section at the first side of the second nozzle plate is equivalent to the diameter of the neck.

In another embodiment, the second converging section converges from a first side to a second side of the second nozzle plate, and a diameter of the second converging section at the first side of the second nozzle plate is greater than the diameter of the neck.

Another embodiment comprises a fabrication system for a printhead. The fabrication system comprises at least one punch press configured to punch first nozzle holes in a first nozzle plate with a first punch, where each of the first nozzle holes includes a first converging section. The at least one punch press is further configured to punch second nozzle holes in a second nozzle plate with a second punch, wherein each of the second nozzle holes includes a second converging section. The fabrication system further comprises a bonding tool configured to bond the first nozzle plate and the second nozzle plate to form a nozzle plate stack, where the first nozzle holes and the second nozzle holes define nozzles of the printhead.

In another embodiment, the at least one punch press is configured to punch the first nozzle holes from a first side through a second side of the first nozzle plate, and the fabrication system further comprises a polishing tool configured to polish the second side of the first nozzle plate to form a planar surface on the second side of the first nozzle plate prior to bonding by the bonding tool.

In another embodiment, the at least one punch press is configured to punch the second nozzle holes from a first side through a second side of the second nozzle plate forming extrusions around the second nozzle holes on the second side of the second nozzle plate, and the fabrication system further comprises a polishing tool configured to polish the second side of the second nozzle plate to remove a portion of the extrusions and leave surface features around the second nozzle holes that define orifices of the nozzles where a print fluid exits the nozzles.

In another embodiment, a first convergence angle of the first converging section is greater than a second convergence angle of the second converging section.

In another embodiment, a first convergence angle of the first converging section is less than a second convergence angle of the second converging section.

In another embodiment, each of the first nozzle holes in the first nozzle plate includes the first converging section, and a neck adjoining the first converging section having a diameter that is uniform.

In another embodiment, the second converging section converges from a first side to a second side of the second nozzle plate, and a diameter of the second converging section at the first side of the second nozzle plate is equivalent to the diameter of the neck.

In another embodiment, the second converging section converges from a first side to a second side of the second nozzle plate; and a diameter of the second converging section at the first side of the second nozzle plate is greater than the diameter of the neck.

Another embodiment comprises a non-transitory computer readable medium embodying programmed instructions executed by a processor. The instructions direct the processor to implement a method of fabricating a printhead. The method comprises controlling at least one punch press to punch first nozzle holes in a first nozzle plate with a first punch, where each of the first nozzle holes includes a first converging section. The method further comprises controlling the at least one punch press to punch second nozzle holes in a second nozzle plate with a second punch, where each of the second nozzle holes includes a second converging section. The method further comprises controlling a bonding tool to bond the first nozzle plate and the second nozzle plate to form a nozzle plate stack, where the first nozzle holes and the second nozzle holes define nozzles of the printhead.

In another embodiment, the first nozzle holes are punched from a first side through a second side of the first nozzle plate, and the method further comprises controlling a polishing tool to polish the second side of the first nozzle plate to form a planar surface on the second side of the first nozzle plate prior to the bonding.

In another embodiment, the second nozzle holes are punched from a first side through a second side of the second nozzle plate forming extrusions around the second nozzle holes on the second side of the second nozzle plate, and the method further comprises controlling a polishing tool to polish the second side of the second nozzle plate to remove a portion of the extrusions and leave surface features around the second nozzle holes that define orifices of the nozzles where a print fluid exits the nozzles.

In another embodiment, each of the first nozzle holes in the first nozzle plate includes the first converging section, and a neck adjoining the first converging section having a diameter that is uniform.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
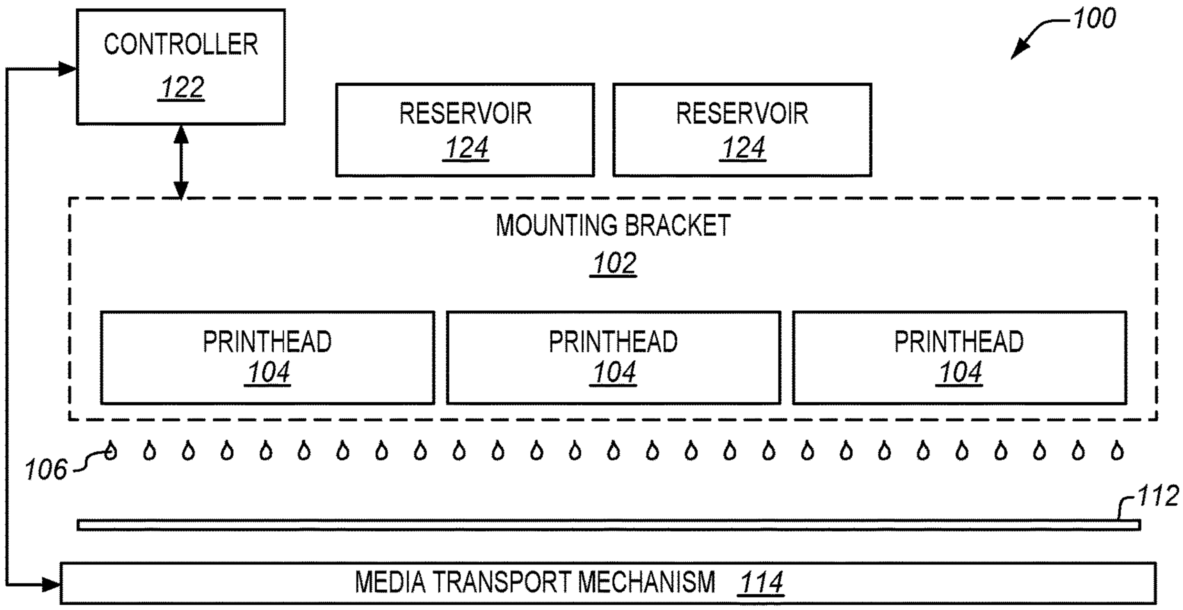
FIG. 1 is a schematic diagram of a jetting apparatus in an illustrative embodiment.

FIG. 1 is a schematic diagram of a jetting apparatus 100 in an illustrative embodiment. One example of jetting apparatus 100 is an inkjet printer that performs single-pass or multi-pass printing. Jetting apparatus 100 includes a mounting bracket 102 that supports one or more printheads 104 above a medium 112. Mounting bracket 102 may be disposed on a carriage assembly that reciprocates back and forth along a scan line or sub-scan direction for multi-pass printing. Alternatively, mounting bracket 102 may be fixed within jetting apparatus 100 for single-pass printing. Printheads 104 are a device, apparatus, or component configured to eject droplets 106 of a print fluid, such as ink (e.g., water, solvent, oil, or UV-curable), through a plurality of orifices or nozzles (not visible in FIG. 1). The droplets 106 ejected from the nozzles of printheads 104 are directed toward medium 112. Medium 112 comprises any type of material upon which ink or another print fluid is applied by a printhead, such as paper, plastic, card stock, transparent sheets, a substrate for 3D printing, cloth, etc. Typically, nozzles of printheads 104 are arranged in one or more rows so that ejection of print fluid from the nozzles causes formation of characters, symbols, images, layers of an object, etc., on medium 112 as printhead 104 and/or medium 112 are moved relative to one another. Media transport mechanism 114 is configured to move medium 112 relative to printheads 104. Jetting apparatus 100 also includes a jetting apparatus controller 122 that controls the overall operation of jetting apparatus 100. Jetting apparatus controller 122 may connect to a data source to receive image data, and control each printhead 104 to discharge the print fluid on a desired pixel grid on medium 112. Jetting apparatus 100 also includes one or more reservoirs 124 for a print fluid. Although not shown in FIG. 1, reservoirs 124 may be connected to printheads 104 via hoses or the like.

Figure 2:
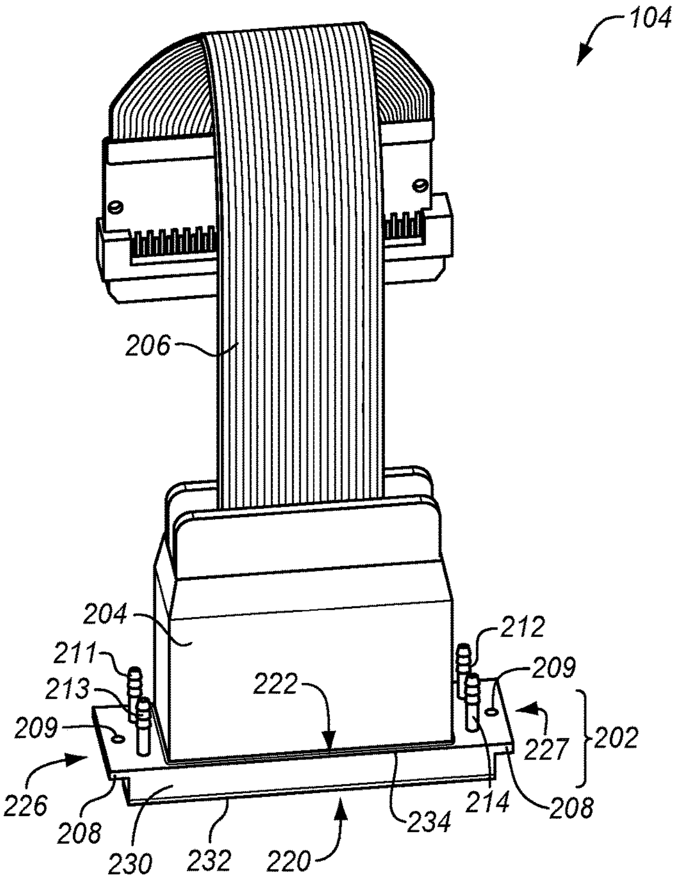
FIG. 2 is a perspective view of a printhead in an illustrative embodiment.

FIG. 2 is a perspective view of a printhead 104 in an illustrative embodiment. Printhead 104 includes a head member 202 and electronics 204. Head member 202 is an elongated component that forms the jetting channels of printhead 104. A typical jetting channel includes a nozzle, a pressure chamber, and a mechanism for ejecting the print fluid from the pressure chamber and through the nozzle, which is typically a diaphragm that is driven by an actuator (e.g., a piezoelectric actuator). Electronics 204 control how the nozzles of printhead 104 jet droplets in response to control signals. Although not visible in FIG. 2, electronics 204 may include a plurality of actuators (e.g., piezoelectric actuators) that contact the diaphragms of the jetting channels. Electronics 204 also include cabling 206, such as a ribbon cable, that connects to a controller (e.g., jetting apparatus controller 122) to receive the control signals. Printhead 104 also includes attachment members 208, which are configured to secure printhead 104 to a jetting apparatus, such as to mounting bracket 102 as illustrated in FIG. 1. Attachment members 208 may include one or more holes 209 so that printhead 104 may be mounted within a jetting apparatus by screws, bolts, pins, etc.

The bottom surface 220 of head member 202 includes the nozzles of the jetting channels, and represents the discharge surface of printhead 104. The top surface 222 of head member 202 represents the Input/Output (I/O) portion for receiving print fluids into printhead 104 and/or conveying print fluids (e.g., fluids that are not jetted) out of printhead 104, such as with the case of a flow-through printhead. Top surface 222, which is also referred to as the I/O surface, includes a plurality of I/O ports 211-214. Top surface 222 has two ends 226-227 that are separated by electronics 204. I/O ports 211/213 are disposed toward end 226, and I/O ports 212/214 are disposed toward end 227. I/O ports 211-214 may include a hose coupling, hose barb, etc., for coupling with a supply hose of a reservoir 124, a cartridge, or the like.

Head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack.

Figure 3:
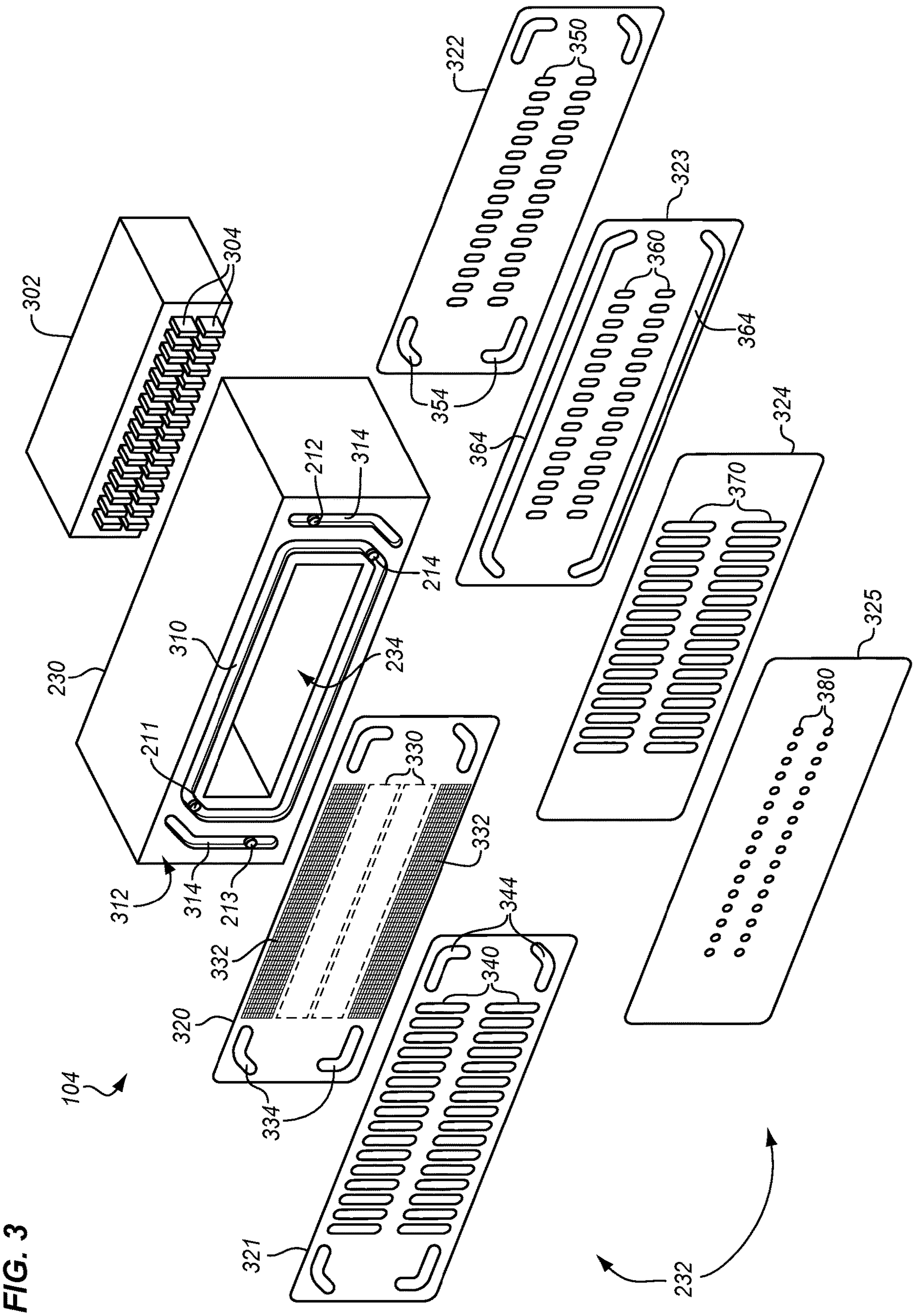
FIG. 3 is an exploded, perspective view of a printhead in an illustrative embodiment.

FIG. 3 is an exploded, perspective view of printhead 104 in an illustrative embodiment. Printhead 104 is a flow-through type of printhead in this embodiment, but non-flow-through types of printheads are considered herein. In this embodiment, printhead 104 includes piezoelectric device 302, housing 230, and plate stack 232. Piezoelectric device 302 includes a plurality of piezoelectric actuators 304 or piezoelectric elements; one for each of the jetting channels. The ends of piezoelectric actuators 304 contact diaphragms at positions opposite the pressure chambers.

Housing 230 includes a groove 310 on interface surface 312 facing plate stack 232 that encompasses or substantially surrounds access hole 234. Groove 310 forms a supply manifold for printhead 104 that is configured to supply a print fluid to the jetting channels. I/O ports 211 and 214 are fluidly coupled to groove 310. Housing 230 further includes one or more grooves 314 on interface surface 312 that are separate or isolated from groove 310. Grooves 314 form a return manifold for printhead 104 that is configured to receive print fluid that flows through the jetting channels and is not ejected from the nozzles. I/O ports 212 and 213 are fluidly coupled to grooves 314.

Plate stack 232 includes plates 320-325 that are fixed or bonded to one another to form a laminated plate structure. Plate stack 232 illustrated in FIG. 3 is intended to be an example of a basic structure of a printhead. There may be additional plates that are used in the plate stack 232 that are not shown in FIG. 3, and the configuration of the various plates may vary as desired. Also, FIG. 3 is not drawn to scale.

In this embodiment, plate stack 232 includes the following plates: a diaphragm plate 320, an upper restrictor plate 321, chamber plates 322-323, a lower restrictor plate 324, and an orifice or nozzle plate 325. Diaphragm plate 320 is a thin sheet of material (e.g., metal, plastic, etc.) that is generally rectangular in shape and is substantially flat or planar. Diaphragm plate 320 includes diaphragm sections 330 comprising a sheet of a semi-flexible material that forms diaphragms for the jetting channels. Diaphragm sections 330 are disposed longitudinally to correspond with the pressure chambers. Diaphragm plate 320 further includes filter sections 332 that are disposed longitudinally on opposing sides of diaphragm sections 330 to coincide with the supply manifold. Filter sections 332 are configured to remove foreign matter from print fluid flowing in the jetting channels from the supply manifold. Although diaphragm plate 320 is shown as including both diaphragm sections 330 and filter sections 332 in this embodiment, diaphragm sections 330 and filter sections 332 may be implemented in separate plates in other embodiments. Diaphragm plate 320 also includes return openings 334 that are part of the return manifold for printhead 104. The return openings 334 are positioned to coincide with at least a portion of groove 314 of housing 230.

Upper restrictor plate 321 is a thin sheet of material that is generally rectangular in shape and is substantially flat or planar. Upper restrictor plate 321 includes restrictor openings 340. Restrictor openings 340 comprise elongated apertures or holes through upper restrictor plate 321 transversely disposed or oriented. Restrictor openings 340 are configured to fluidly couple pressure chambers of the jetting channels with the supply manifold. Upper restrictor plate 321 also includes return openings 344 disposed toward ends of upper restrictor plate 321 to coincide with return openings 334 of diaphragm plate 320.

Chamber plate 322 is a thin sheet of material that is generally rectangular in shape and is substantially flat or planar. Chamber plate 322 includes chamber openings 350 disposed toward a middle region of chamber plate 322. Chamber openings 350 comprise apertures or holes through chamber plate 322 that form pressure chambers for the jetting channels. Chamber plate 322 also includes return openings 354 disposed toward ends of chamber plate 322 to coincide with return openings 344 of upper restrictor plate 321.

Chamber plate 323 is a thin sheet of material that is generally rectangular in shape and is substantially flat or planar. Chamber plate 323 includes chamber openings 360 disposed toward a middle region of chamber plate 323. Chamber openings 360 coincide with chamber openings 350 of chamber plate 322 to form the pressure chambers for the jetting channels. Chamber plate 323 also includes return openings 364, which comprise elongated apertures or holes through chamber plate 323 disposed longitudinally along a length of chamber plate 323. Return openings 364 are disposed toward the long sides of chamber plate 323 on opposing sides of chamber openings 360 to form the return manifold. At least a portion of return openings 364 coincide with return openings 354 of chamber plate 322.

Lower restrictor plate 324 is a thin sheet of material that is generally rectangular in shape and is substantially flat or planar. Lower restrictor plate 324 includes restrictor openings 370, which comprise elongated apertures or holes through lower restrictor plate 324 transversely disposed or oriented. Restrictor openings 370 are configured to fluidly couple pressure chambers of the jetting channels with the return manifold.

Nozzle plate 325 is a thin sheet of material that is generally rectangular in shape and is substantially flat or planar. Nozzle plate 325 includes orifices that form nozzles 380 of the jetting channels. Each nozzle 380 represents an individual jetting channel in printhead 104 for ejecting a print fluid. In this embodiment, nozzles 380 are arranged in two nozzle rows. However, nozzles 380 may be arranged in a single row or in more than two rows in other embodiments.

Figure 4:
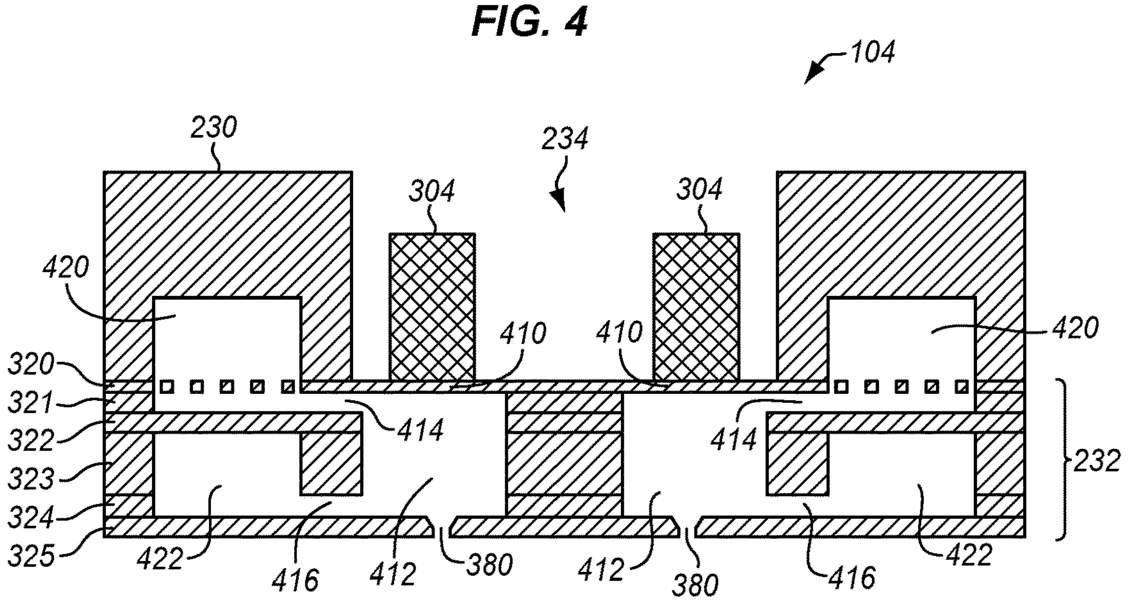
FIG. 4 is a cross-sectional view of jetting channels in a printhead in an illustrative embodiment.

FIG. 4 is a cross-sectional view of jetting channels in printhead 104 in an illustrative embodiment. The view in FIG. 4 is as if a slice were taken transversely through printhead 104. From top to bottom in FIG. 4, printhead 104 includes housing 230, diaphragm plate 320, upper restrictor plate 321, chamber plates 322-323, lower restrictor plate 324, and nozzle plate 325. A jetting channel includes diaphragm 410, pressure chamber 412, and nozzle 380. Pressure chamber 412 is fluidly coupled to a supply manifold 420 via an upper restrictor 414. Upper restrictor 414 controls the flow of print fluid from the supply manifold 420 to pressure chamber 412. Pressure chamber 412 is also fluidly coupled to a return manifold 422 via a lower restrictor 416. Lower restrictor 416 controls the flow of print fluid from pressure chamber 412 to return manifold 422. Actuation by a piezoelectric actuator 304 will cause the print fluid to be ejected out of the jetting channel through nozzle 380.

Although a piezoelectric printhead 104 is illustrated in FIGS. 3-4, other types of printheads 104 may be used in jetting apparatus 100, such as a thermal printhead.

Figure 5:
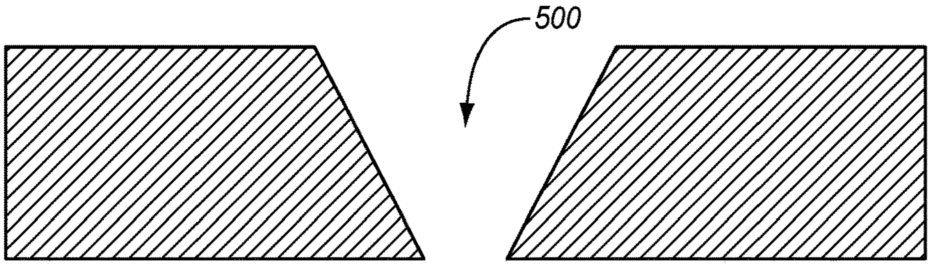
FIGS. 5-6 are cross-sectional views of a traditional nozzle of a printhead.
Figure 6:
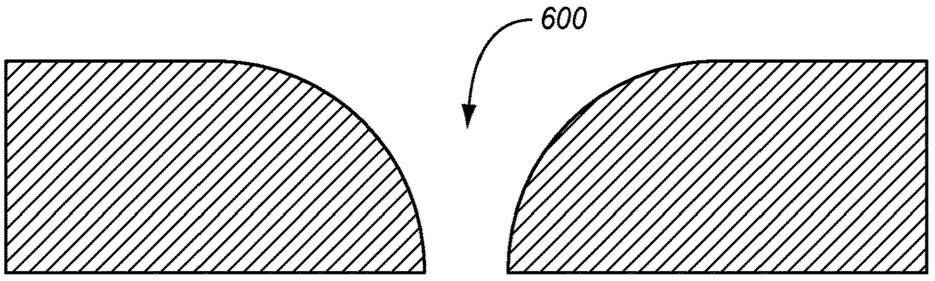

FIGS. 5-6 are cross-sectional views of a traditional nozzle of a printhead. Nozzle 500 in FIG. 5 is a cone-shaped nozzle, and nozzle 600 in FIG. 6 is a bell-shaped nozzle. Nozzles 500-600 are both convergent nozzles where the cross-sectional area decreases. As a print fluid enters the smaller cross-section, it increases in velocity due to the conservation of mass. Although these nozzle shapes may be effective for their intended purpose, other nozzle shapes may provide different or better jetting characteristics.

Figure 7:
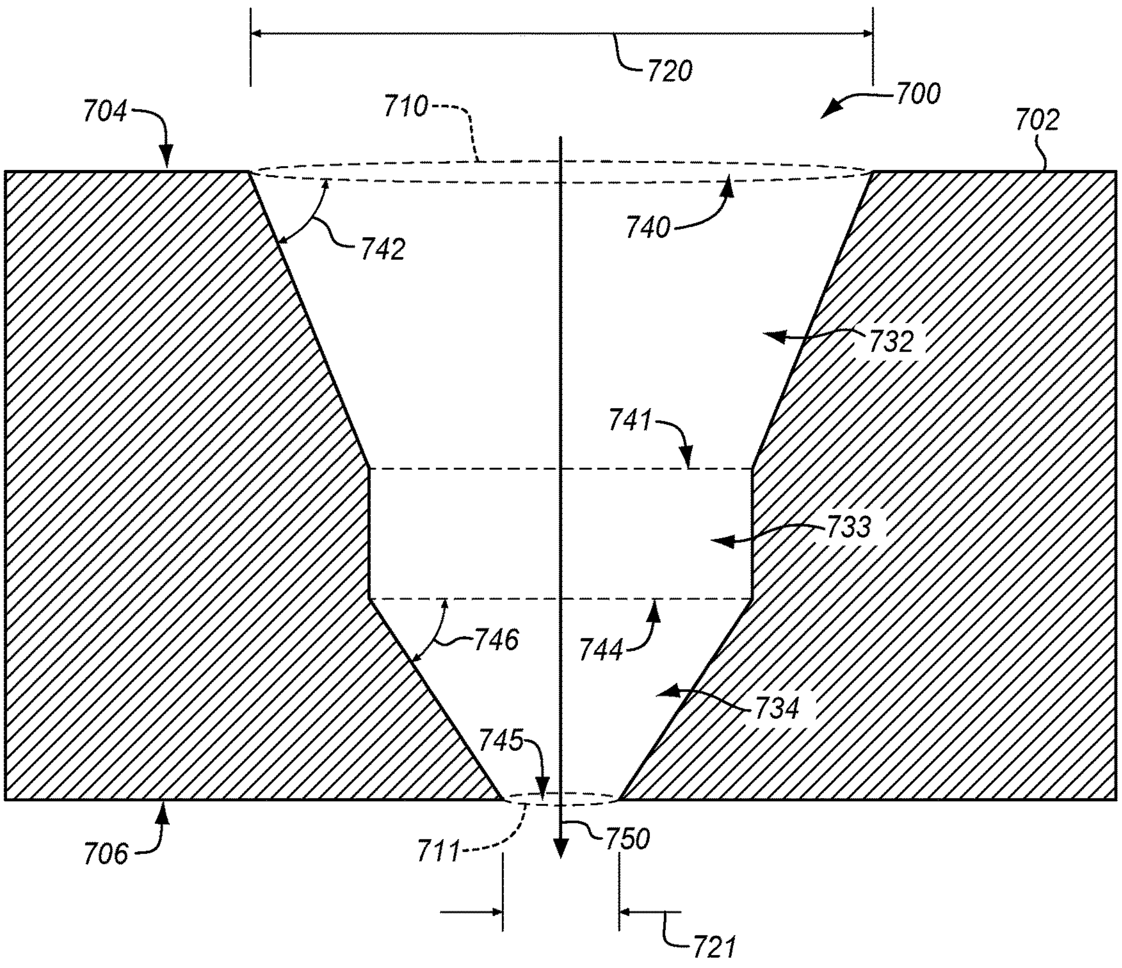
FIG. 7 is a cross-sectional view of a nozzle of a printhead in an illustrative embodiment.

FIG. 7 is a cross-sectional view of a nozzle 700 of a printhead in an illustrative embodiment. Nozzle 700 may be an example of a nozzle 380 described above for printhead 104. Nozzle 700 comprises an aperture or opening through one or more nozzle plates 702. Nozzle plate(s) 702 in FIG. 7 may be an example of nozzle plate 325 shown in FIG. 3. Nozzle plate 702 includes an interface surface 704 and a discharge surface 706. Interface surface 704 represents a surface that abuts another plate in a plate stack, such as a lower restrictor plate 324 in FIG. 3. Discharge surface 706 represents the surface from which a droplet of print fluid is ejected or jetted from a printhead. One end of nozzle 700 is toward a higher-pressure region within a printhead (e.g., a pressure chamber), and is the entrance 710 for a print fluid into nozzle 700. The other end of nozzle 700 is toward a lower-pressure region outside of the printhead (e.g., ambient air), and is the exit 711 for the print fluid out of nozzle 700. Exit 711 may also be referred to as the orifice. Entrance 710 has a diameter 720 that is larger than a diameter 721 of exit 711.

From entrance 710 to exit 711 along its length, nozzle 700 is comprised of a first converging section 732, a neck 733 that abuts or adjoins first converging section 732, and a second converging section 734 that abuts or adjoins neck 733. First converging section 732 has a cross-sectional area (taken transverse or width-wise, which is into the page in FIG. 7) that decreases in the flow direction of print fluid through nozzle 700, which is indicated by arrow 750. First converging section 732 has a cone shape that tapers or angles from end 740 to end 741 so that the diameter of first converging section 732 decreases from end 740 to end 741. Neck 733 has a cross-sectional area that is generally constant, uniform, or otherwise continuous in the flow direction of print fluid through nozzle 700. The diameter of neck 733 may correspond with the diameter of first converging section 732 at end 741, and remains uniform along a length of neck 733 in the flow direction (e.g., arrow 750). Second converging section 734 has a cross-sectional area that decreases in the flow direction of print fluid through nozzle 700. Second converging section 734 has a cone shape that tapers or angles from end 744 to end 745 so that the diameter of second converging section 734 decreases from end 744 to end 745 (i.e., exit 711). In this embodiment, the diameter (or cross-sectional area) of second converging section 734 at end 744 is generally the same as or equivalent to the diameter (or cross-sectional area) of neck 733. The diameter 721 of second converging section 734 at end 745 is less than the diameter of neck 733 and first converging section 732 at end 741.

A head designer may adjust the convergence angle 742 of first converging section 732, the convergence angle 746 of second converging section 734, and/or the diameter of neck 733 based on the desired jetting characteristics. In one embodiment, the convergence angles 742/746 may be the same or equivalent. In another embodiment, the convergence angle 742 of first converging section 732 may be greater than the convergence angle 746 of second converging section 734. In another embodiment, the convergence angle 746 of second converging section 734 may be greater than the convergence angle 742 of first converging section 732.

As a print fluid travels through first converging section 732, the velocity of the print fluid increases due to the converging shape of first converging section 732 (i.e., conservation of mass). As the print fluid travels through neck 733, the velocity of the print fluid stays constant due to the uniform diameter of neck 733. As a print fluid travels through second converging section 734, the velocity of the print fluid again increases due to the converging shape of second converging section 734. The difference in velocity of the print fluid in the different sections of nozzle 700 affects the viscous forces of the print fluid in nozzle 700, and creates an instability in the jet discharged from nozzle 700. This instability accelerates the break-off time of the jet from nozzle 700, and reduces the length of the ligament of the jet. This may be beneficial with high viscosity print fluids (e.g., 100 cP or more) or ultra-high viscosity print fluids (e.g., 1,000-10,000 cP or more). The difference in velocity may be exploited further for different objectives by using different firing modes to create the desired droplet shape. Larger or smaller droplet sizes may be created by means of adjusting the firing order of the wave-form. For example, a fill-before-fire favors a large inertial force over viscous forces, which in turn leads to an accelerated break-off of the jet. This is often characterized by the shortest ligament and fastest break-off time. It has the added benefit of creating fewer or no satellites. This leads to higher frequency jetting combined with less ill effects of the satellites or the creation of mist. The fire-before-fill is to be contrasted with fill-before-fire, which leads to smaller droplets and longer ligaments but within an acceptable range for jetting at these viscosities.

Figure 8:
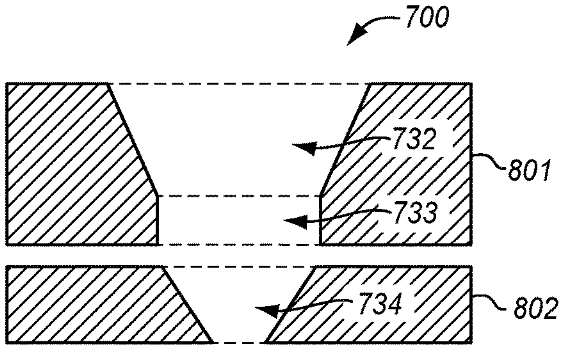
FIG. 8 is a cross-sectional view of a nozzle formed by two nozzle plates in an illustrative embodiment.
Figure 9:
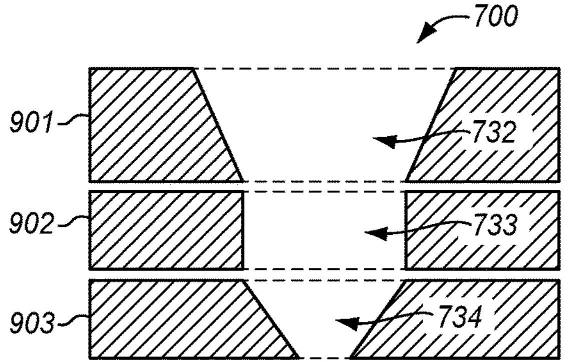
FIG. 9 is a cross-sectional view of a nozzle formed by three nozzle plates in an illustrative embodiment.

Nozzle 700 may be formed in a single nozzle plate 702 as shown in FIG. 7. Alternatively, a plurality of nozzle plates may be stacked together to form nozzle 700. FIG. 8 is a cross-sectional view of nozzle 700 formed by two nozzle plates in an illustrative embodiment. In this embodiment, nozzle 700 is formed with nozzle plates 801-802. Nozzle plate 801 defines or forms first converging section 732 and neck 733, while nozzle plate 802 defines or forms second converging section 734. FIG. 9 is a cross-sectional view of nozzle 700 formed by three nozzle plates in an illustrative embodiment. In this embodiment, nozzle 700 is formed with nozzle plates 901-903. Nozzle plate 901 defines or forms first converging section 732, nozzle plate 902 defines or forms neck 733, and nozzle plate 903 defines or forms second converging section 734. Nozzle 700 may be formed by more nozzle plates in other embodiments.

Figure 10:
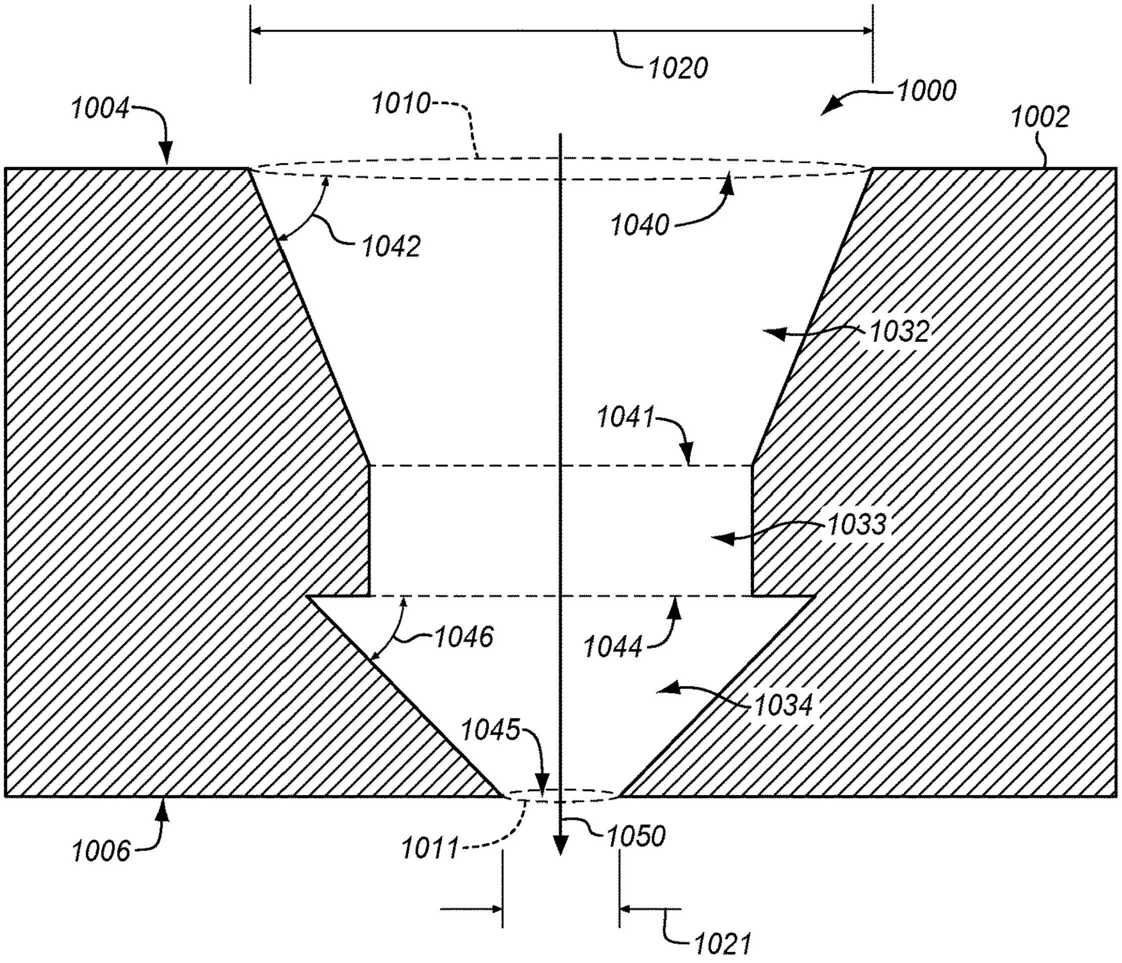
FIG. 10 is a cross-sectional view of a nozzle of a printhead in another illustrative embodiment.

FIG. 10 is a cross-sectional view of a nozzle 1000 of a printhead in another illustrative embodiment. Nozzle 1000 may be another example of a nozzle 380 described above for printhead 104. Nozzle 1000 comprises an aperture or opening through one or more nozzle plates 1002. Nozzle plate(s) 1002 in FIG. 10 may be an example of nozzle plate 325 shown in FIG. 3. Nozzle plate 1002 includes an interface surface 1004 and a discharge surface 1006. Interface surface 1004 represents a surface that abuts another plate in a plate stack, such as a lower restrictor plate 324 in FIG. 3. Discharge surface 1006 represents the surface from which a droplet of print fluid is ejected or jetted from a printhead. One end of nozzle 1000 is toward a higher-pressure region within a printhead (e.g., a pressure chamber), and is the entrance 1010 for a print fluid into nozzle 1000. The other end of nozzle 1000 is toward a lower-pressure region outside of the printhead (e.g., ambient air), and is the exit 1011 for the print fluid out of nozzle 1000. Entrance 1010 has a diameter 1020 that is larger than a diameter 1021 of exit 1011.

From entrance 1010 to exit 1011, nozzle 1000 includes a first converging section 1032, a neck 1033 that abuts or adjoins first converging section 1032, and a second converging section 1034 that abuts or adjoins neck 1033. First converging section 1032 has a cross-sectional area that decreases in the flow direction of print fluid through nozzle 1000, which is indicated by arrow 1050. First converging section 1032 has a cone shape that tapers or angles from end 1040 to end 1041 so that the diameter of first converging section 1032 decreases from end 1040 to end 1041. Neck 1033 has a cross-sectional area that is generally constant, uniform, or otherwise continuous in the flow direction of print fluid through nozzle 1000. The diameter of neck 1033 may correspond with the diameter of first converging section 1032 at end 1041, and remains uniform along a length of neck 1033 in the flow direction (e.g., arrow 1050). Second converging section 1034 has a cross-sectional area that decreases in the flow direction of print fluid through nozzle 1000. Second converging section 1034 has a cone shape that tapers or angles from end 1044 to end 1045 (i.e., exit 1011) so that the diameter of second converging section 1034 decreases from end 1044 to end 1045. In this embodiment, the diameter (or cross-sectional area) of second converging section 1034 at end 1044 is larger than the diameter (or cross-sectional area) of neck 1033. Thus, nozzle 1000 diverges in the region where neck 1033 transitions into second converging section 1034. The diameter 1021 of second converging section 1034 at end 1045 is less than the diameter of neck 1033 and first converging section 1032 at end 1041.

A head designer may adjust the convergence angle 1042 of first converging section 1032, the convergence angle 1046 of second converging section 1034, and/or the diameter of neck 1033 based on the desired jetting characteristics. In one embodiment, the convergence angles 1042/1046 may be the same or equivalent. In another embodiment, the convergence angle 1042 of first converging section 1032 may be greater than the convergence angle 1046 of second converging section 1034. In another embodiment, the convergence angle 1046 of second converging section 1034 may be greater than the convergence angle 1042 of first converging section 1032.

As a print fluid travels through first converging section 1032, the velocity of the print fluid increases due to the converging shape of first converging section 1032 (i.e., conservation of mass). As the print fluid travels through neck 1033, the velocity of the print fluid stays constant due to the uniform diameter of neck 1033. As a print fluid travels out of neck 1033 and into second converging section 1034, the velocity of the print fluid decreases due to the larger diameter of second converging section 1034. As the print fluid travels through second converging section 1034, the velocity of the print fluid again increases due to the converging shape of second converging section 1034. The difference in velocity of the print fluid in the different sections of nozzle 1000 affects the viscous forces of the print fluid in nozzle 1000, especially where the shape of nozzle 1000 sharply deviates from the uniform diameter of neck 1033 to the larger diameter of second converging section 1034. This creates an instability in the jet discharged from nozzle 1000, which accelerates the break-off time of the jet from nozzle 1000, and reduces the length of the ligament of the jet. The difference in velocity is helped in this case by the presence of a geometry that increases the inertial force by increasing the fluid mass available at the base of second converging section 1034. This design makes available an inertial mass that is faster to deploy into the jet from the layer closest to nozzle 1000.

Figure 11:
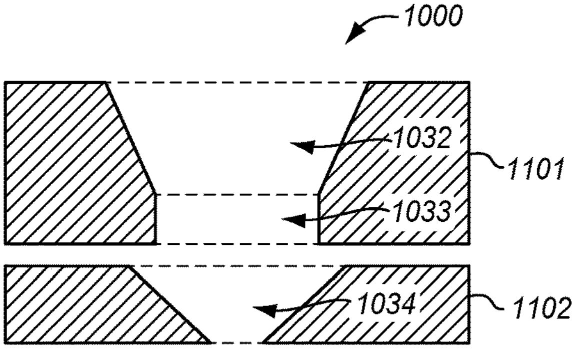
FIG. 11 is a cross-sectional view of a nozzle formed by two nozzle plates in an illustrative embodiment.
Figure 12:
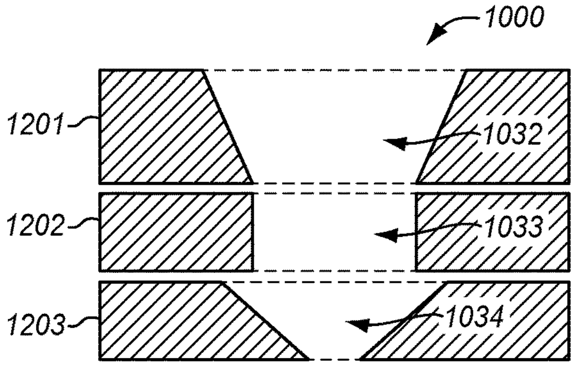
FIG. 12 is a cross-sectional view of a nozzle formed by three nozzle plates in an illustrative embodiment.

Nozzle 1000 may be formed in a single nozzle plate 1002 as shown in FIG. 10. Alternatively, a plurality of nozzle plates may be stacked together to form nozzle 1000. FIG. 11 is a cross-sectional view of nozzle 1000 formed by two nozzle plates in an illustrative embodiment. In this embodiment, nozzle 1000 is formed with nozzle plates 1101-1102. Nozzle plate 1101 defines or forms first converging section 1032 and neck 1033, while nozzle plate 1102 defines or forms second converging section 1034. FIG. 12 is a cross-sectional view of nozzle 1000 formed by three nozzle plates in an illustrative embodiment. In this embodiment, nozzle 1000 is formed with nozzle plates 1201-1203. Nozzle plate 1201 defines or forms first converging section 1032, nozzle plate 1202 defines or forms neck 1033, and nozzle plate 1203 defines or forms second converging section 1034. Nozzle 1000 may be formed by more nozzle plates in other embodiments.

Figure 13:
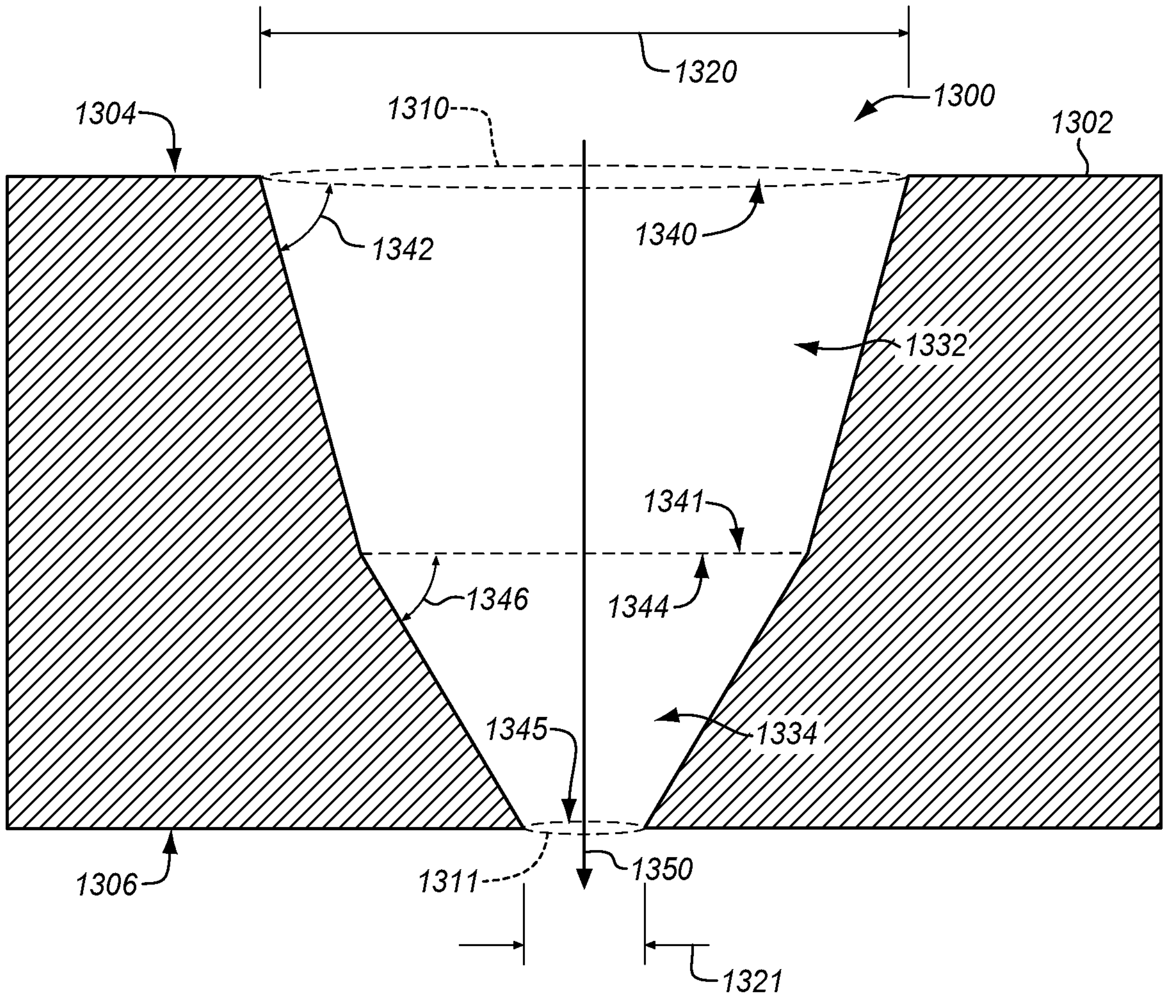
FIG. 13 is a cross-sectional view of a nozzle of a printhead in another illustrative embodiment.

FIG. 13 is a cross-sectional view of a nozzle 1300 of a printhead in an illustrative embodiment. Nozzle 1300 may be an example of a nozzle 380 described above for printhead 104. Nozzle 1300 comprises an aperture or opening through one or more nozzle plates 1302. Nozzle plate(s) 1302 in FIG. 13 may be an example of nozzle plate 325 shown in FIG. 3. Nozzle plate 1302 includes an interface surface 1304 and a discharge surface 1306. Interface surface 1304 represents a surface that abuts another plate in a plate stack, such as a lower restrictor plate 324 in FIG. 3. Discharge surface 1306 represents the surface from which a droplet of print fluid is ejected or jetted from a printhead. One end of nozzle 1300 is toward a higher-pressure region within a printhead (e.g., a pressure chamber), and is the entrance 1310 for a print fluid into nozzle 1300. The other end of nozzle 1300 is toward a lower-pressure region outside of the printhead (e.g., ambient air), and is the exit 1311 for the print fluid out of nozzle 1300. Exit 1311 may also be referred to as the orifice. Entrance 1310 has a diameter 1320 that is larger than a diameter 1321 of exit 1311.

From entrance 1310 to exit 1311 along its length, nozzle 1300 is comprised of a first converging section 1332, and a second converging section 1334 that abuts or adjoins first converging section 1332. First converging section 1332 has a cross-sectional area that decreases in the flow direction of print fluid through nozzle 1300, which is indicated by arrow 1350. First converging section 1332 has a cone shape that tapers or angles from end 1340 to end 1341 so that the diameter of first converging section 1332 decreases from end 1340 to end 1341. Second converging section 1334 has a cross-sectional area that decreases in the flow direction of print fluid through nozzle 1300. Second converging section 1334 has a cone shape that tapers or angles from end 1344 to end 1345 so that the diameter of second converging section 1334 decreases from end 1344 to end 1345 (i.e., exit 1311). In this embodiment, the diameter (or cross-sectional area) of second converging section 1334 at end 1344 is generally the same as or equivalent to the diameter (or cross-sectional area) of first converging section 1332 at end 1341. The diameter 1321 of second converging section 1334 at end 1345 is less than the diameter of first converging section 1332 at end 1341.

A head designer may adjust the convergence angle 1342 of first converging section 1332, and/or the convergence angle 1346 of second converging section 1334 based on the desired jetting characteristics. The convergence angles 1342/1346 are different to create velocity changes of the print fluid through nozzle 1300. In this embodiment, the convergence angle 1342 of first converging section 1332 is less than the convergence angle 1346 of second converging section 1334.

As a print fluid travels through first converging section 1332, the velocity of the print fluid increases due to the converging shape of first converging section 1332. As a print fluid travels through second converging section 1334, the velocity of the print fluid again increases due to the converging shape of second converging section 1334. The difference in velocity of the print fluid in the different sections of nozzle 1300 affects the viscous forces of the print fluid in nozzle 1300, and creates an instability in the jet discharged from nozzle 1300. This instability accelerates the break-off time of the jet from nozzle 1300, and reduces the length of the ligament of the jet.

Figure 14:
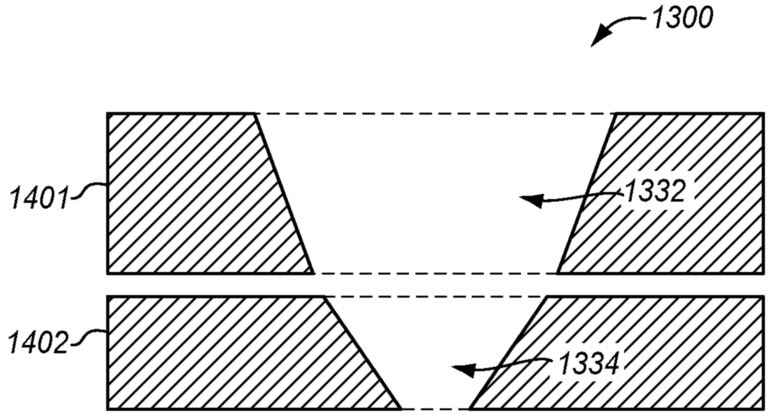
FIG. 14 is a cross-sectional view of a nozzle formed by two nozzle plates in an illustrative embodiment.

Nozzle 1300 may be formed in a single nozzle plate 1302 as shown in FIG. 13. Alternatively, a plurality of nozzle plates may be stacked together to form nozzle 1300. FIG. 14 is a cross-sectional view of nozzle 1300 formed by two nozzle plates in an illustrative embodiment. In this embodiment, nozzle 1300 is formed with nozzle plates 1401-1402. Nozzle plate 1401 defines or forms first converging section 1332, while nozzle plate 1402 defines or forms second converging section 1334. Nozzle 1300 may be formed by more nozzle plates in other embodiments.

Figure 15:
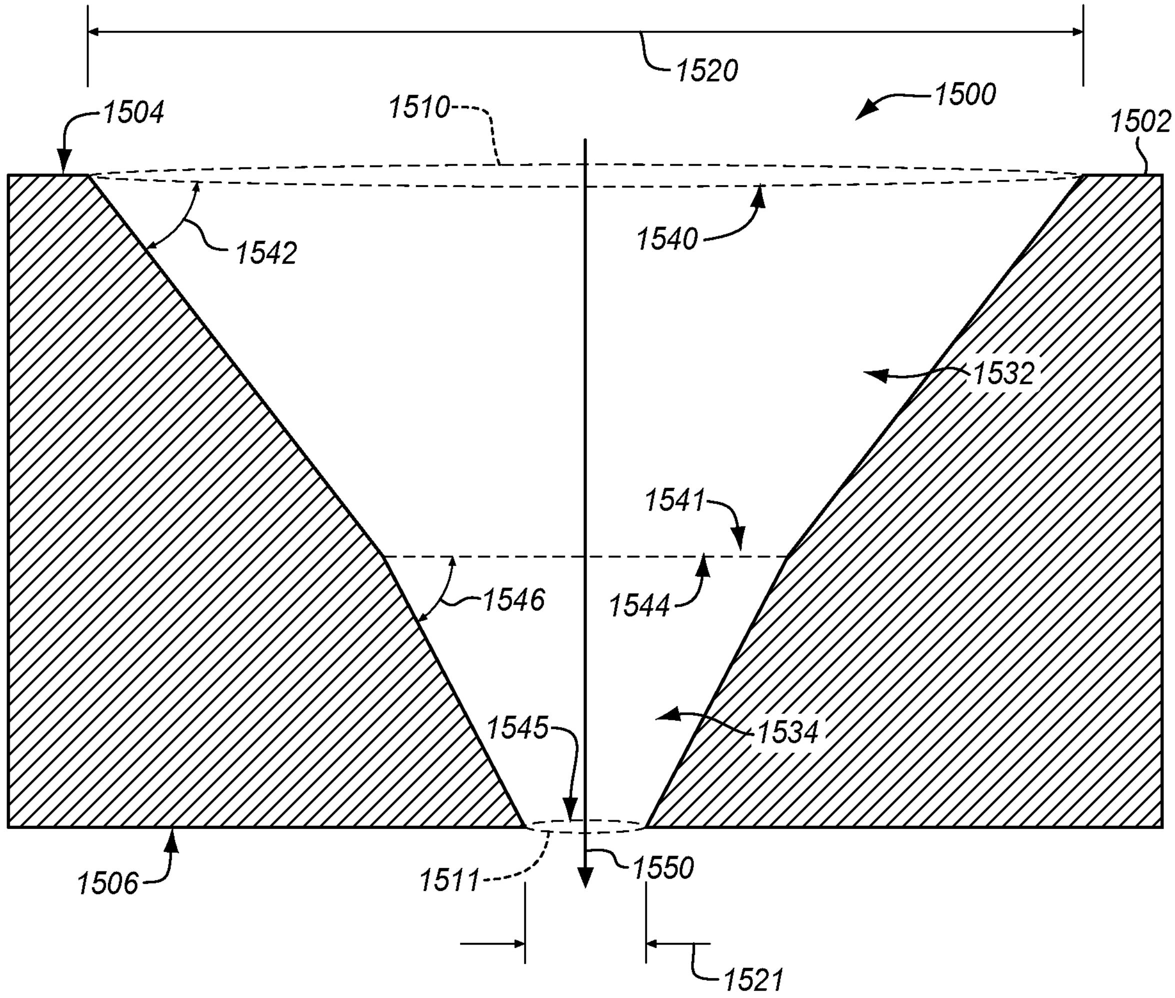
FIG. 15 is a cross-sectional view of a nozzle of a printhead in another illustrative embodiment.

FIG. 15 is a cross-sectional view of a nozzle 1500 of a printhead in an illustrative embodiment. Nozzle 1500 may be an example of a nozzle 380 described above for printhead 104. Nozzle 1500 comprises an aperture or opening through one or more nozzle plates 1502. Nozzle plate(s) 1502 in FIG. 15 may be an example of nozzle plate 325 shown in FIG. 3. Nozzle plate 1502 includes an interface surface 1504 and a discharge surface 1506. Interface surface 1504 represents a surface that abuts another plate in a plate stack, such as a lower restrictor plate 324 in FIG. 3. Discharge surface 1506 represents the surface from which a droplet of print fluid is ejected or jetted from a printhead. One end of nozzle 1500 is toward a higher-pressure region within a printhead (e.g., a pressure chamber), and is the entrance 1510 for a print fluid into nozzle 1500. The other end of nozzle 1500 is toward a lower-pressure region outside of the printhead (e.g., ambient air), and is the exit 1511 for the print fluid out of nozzle 1500. Exit 1511 may also be referred to as the orifice. Entrance 1510 has a diameter 1520 that is larger than a diameter 1521 of exit 1511.

From entrance 1510 to exit 1511 along its length, nozzle 1500 is comprised of a first converging section 1532, and a second converging section 1534 that abuts or adjoins first converging section 1532. First converging section 1532 has a cross-sectional area that decreases in the flow direction of print fluid through nozzle 1500, which is indicated by arrow 1550. First converging section 1532 has a cone shape that tapers or angles from end 1540 to end 1541 so that the diameter of first converging section 1532 decreases from end 1540 to end 1541. Second converging section 1534 has a cross-sectional area that decreases in the flow direction of print fluid through nozzle 1500. Second converging section 1534 has a cone shape that tapers or angles from end 1544 to end 1545 so that the diameter of second converging section 1534 decreases from end 1544 to end 1545 (i.e., exit 1511). In this embodiment, the diameter (or cross-sectional area) of second converging section 1534 at end 1544 is generally the same as or equivalent to the diameter (or cross-sectional area) of first converging section 1532 at end 1541. The diameter 1521 of second converging section 1534 at end 1545 is less than the diameter of first converging section 1532 at end 1541.

A head designer may adjust the convergence angle 1542 of first converging section 1532, and/or the convergence angle 1546 of second converging section 1534 based on the desired jetting characteristics. The convergence angles 1542/1546 are different to create velocity changes of the print fluid through nozzle 1500. In this embodiment, the convergence angle 1542 of first converging section 1532 is greater than the convergence angle 1546 of second converging section 1534.

As a print fluid travels through first converging section 1532, the velocity of the print fluid increases due to the converging shape of first converging section 1532. As a print fluid travels through second converging section 1534, the velocity of the print fluid again increases due to the converging shape of second converging section 1534. The difference in velocity of the print fluid in the different sections of nozzle 1500 affects the viscous forces of the print fluid in nozzle 1500, and creates an instability in the jet discharged from nozzle 1500. This instability accelerates the break-off time of the jet from nozzle 1500, and reduces the length of the ligament of the jet.

Figure 16:
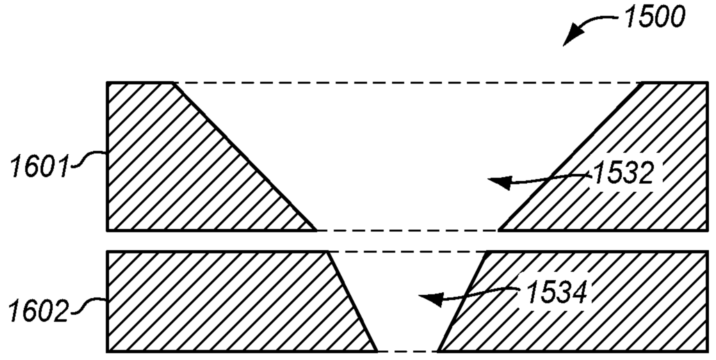
FIG. 16 is a cross-sectional view of a nozzle formed by two nozzle plates in an illustrative embodiment.

Nozzle 1500 may be formed in a single nozzle plate 1502 as shown in FIG. 15. Alternatively, a plurality of nozzle plates may be stacked together to form nozzle 1500. FIG. 16 is a cross-sectional view of nozzle 1500 formed by two nozzle plates in an illustrative embodiment. In this embodiment, nozzle 1500 is formed with nozzle plates 1601-1602. Nozzle plate 1601 defines or forms first converging section 1532, while nozzle plate 1602 defines or forms second converging section 1534. Nozzle 1500 may be formed by more nozzle plates in other embodiments.

Figure 17:
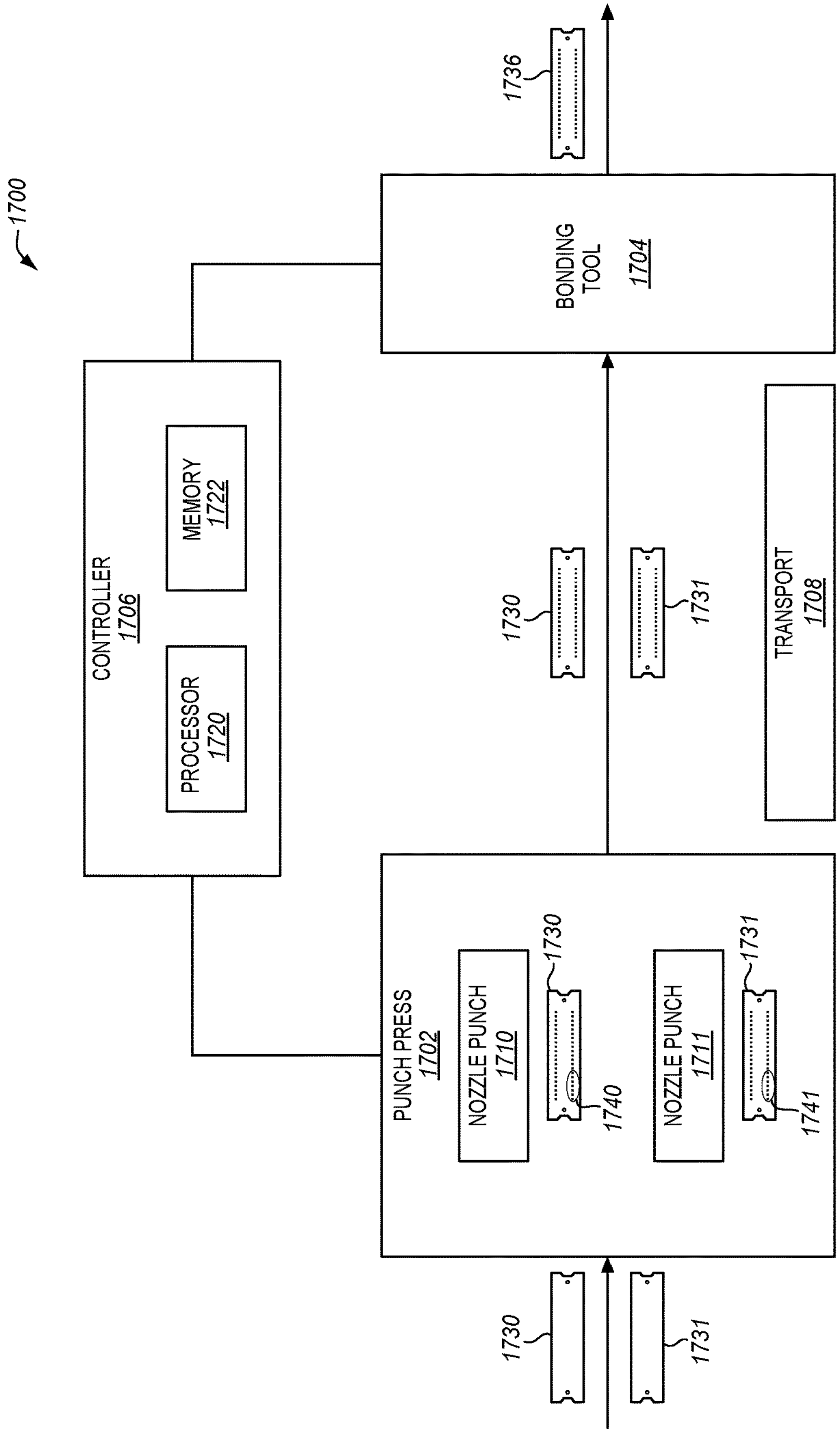
FIG. 17 is a block diagram of a fabrication system in an illustrative embodiment.

The following describes fabrication systems and methods that may be used to form nozzles having the nozzle geometries discussed above, along with other geometries/shapes. FIG. 17 is a block diagram of a fabrication system 1700 in an illustrative embodiment. Fabrication system 1700 is configured to form a nozzle plate (e.g., nozzle plate 325) or a plate stack (e.g., plate stack 232) for a printhead (e.g., printhead 104). Fabrication system 1700 includes a plurality of fabrication devices that represents various stages of fabrication. Tasks performed at the fabrication devices may be automated, may be manual, or may be a combination of automated tasks and manual tasks. In this embodiment, fabrication system 1700 includes a punch press 1702 (or multiple punch presses), which is type of machine or equipment configured to form a hole in a workpiece, such as a nozzle plate. Punch press 1702 includes a plurality of nozzle punches 1710-1711. A nozzle punch 1710-1711 is a tool that is forced through a workpiece to create a hole in the workpiece via shearing to form at least part of a nozzle of a printhead. Nozzle punches 1710-1711 may have a variety of shapes to create different holes in a workpiece for a nozzle. Although one punch press 1702 is shown in FIG. 17, fabrication system 1700 may include multiple punch presses each having a nozzle punch 1710-1711.

Fabrication system 1700 further includes a bonding tool 1704. Bonding tool 1704 is a type of device that bonds or laminates two or more plates together to form a plate stack or laminated plate stack. For example, bonding tool 1704 may be configured to bond multiple plates for a printhead together in a stack, such as multiple nozzle plates 325, restrictor plates 321/324, chamber plates 322-323, a diaphragm plate 320, etc. Bonding tool 1704 may include alignment pins or other alignment features configured to align the plates in parallel. Bonding tool 1704 may use an adhesive, heat, pressure, etc., to form bonds between the major surfaces of the plates.

Fabrication system 1700 may further include a controller 1706 that is configured to manage the (automated) operations for one or more of the fabrication devices. Controller 1706 may be implemented on a hardware platform comprised of a processor 1720 that executes instructions stored in memory 1722 as shown in FIG. 17. A processor 1720 comprises an integrated hardware circuit configured to execute instructions, and memory 1722 is a non-transitory computer readable storage medium for data, instructions, applications, etc., and is accessible by processor 1720. Although not shown in FIG. 17, controller 1706 may be implemented on a hardware platform comprised of analog circuitry, digital circuitry, or a combination of the two.

Fabrication system 1700 may further include a transport device 1708 that is configured to transport nozzle plates between punch press 1702 and bonding tool 1704. Transport device 1708 may comprise a conveyor, robotic arm, etc.

Fabrication system 1700 may include other fabrication devices that are not shown for the sake of brevity.

As a high-level overview of the operation of fabrication system 1700, nozzle plates 1730-1731 are loaded or otherwise registered in punch press 1702. For nozzle plate 1730, punch press 1702 performs a punching process that forces nozzle punch 1710 through nozzle plate 1730 to create a plurality of nozzle holes 1740 that form part of the nozzles for a printhead. For nozzle plate 1731, punch press 1702 performs a punching process that forces nozzle punch 1711 through nozzle plate 1731 to create a plurality of nozzle holes 1741 that form another part of the nozzles for a printhead. Punch press 1702 may perform a punching process on a number of other nozzle plates as desired. With nozzle holes 1740-1741 punched in nozzle plates 1730-1731, the nozzle plates 1730-1731 may be transferred to bonding tool 1704. Bonding tool 1704 bonds the nozzle plates 1730-1731 together to form a nozzle plate stack 1736. Within nozzle plate stack 1736, the nozzle holes 1740 of nozzle plate 1730 are aligned with the nozzle holes 1741 of nozzle plate 1731 to define the nozzles of a printhead. Bonding tool 1704 may also receive additional plates for the printhead, such as restrictor plates 321/324, chamber plates 322-323, a diaphragm plate 320, etc., and bond these plates along with the nozzle plates 1730-1731 to form the plate stack 232 for the printhead.

Although the above described two nozzle plates 1730-1731 as forming the nozzle plate stack 1736, it is noted that more than two nozzle plates may be fabricated with punch press 1702 and bonded together to form nozzle plate stack 1736 in other embodiments.

Figure 18:
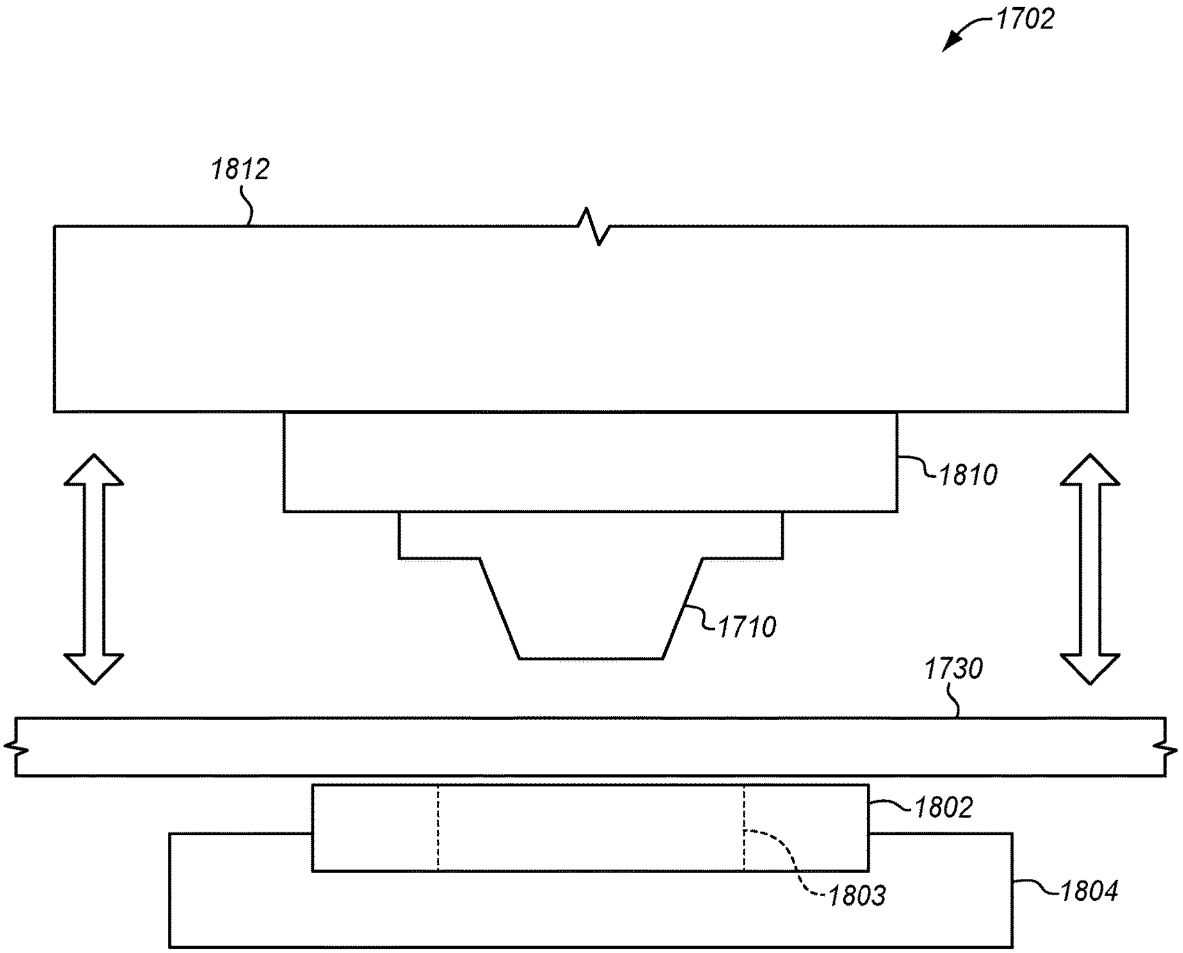
FIG. 18 is a block diagram of a punch press in an illustrative embodiment.

FIG. 18 is a block diagram of punch press 1702 in an illustrative embodiment. Punch press 1702 includes a nozzle punch 1710, and a die 1802 located on the opposite side of a workpiece (i.e., a nozzle plate 1730). Die 1802 is held in place by a die support 1804. Die 1802 includes a die hole 1803, and acts to support the material around the perimeter of the hole formed in the workpiece and localize the shearing forces for a cleaner edge. Nozzle punch 1710 and die 1802 are made from a harder material than a nozzle plate 1730, such as a hardened steel, tungsten carbide, etc. Nozzle punch 1710 attaches to a punch coupler 1810, which in turn is attached to a ram 1812. Although not shown, punch press 1702 may also include a mechanism of delivering power to ram 1812 (e.g., mechanical, electro-mechanical, or hydraulic). Ram 1812 is configured to move punch coupler 1810 and nozzle punch 1710 up and down in a vertically linear motion in FIG. 18. Thus, with a nozzle plate 1730 loaded between nozzle punch 1710 and die 1802, ram 1812 is able to move nozzle punch 1710 toward die 1802 and force nozzle punch 1710 through nozzle plate 1730 and into the die hole 1803 of die 1802. When pressed together, nozzle punch 1710 and die 1802 form a hole in nozzle plate 1730. The length of the stroke in which ram 1812 moves nozzle punch 1710 downward toward die 1802 is adjustable and controllable.

Figure 19:
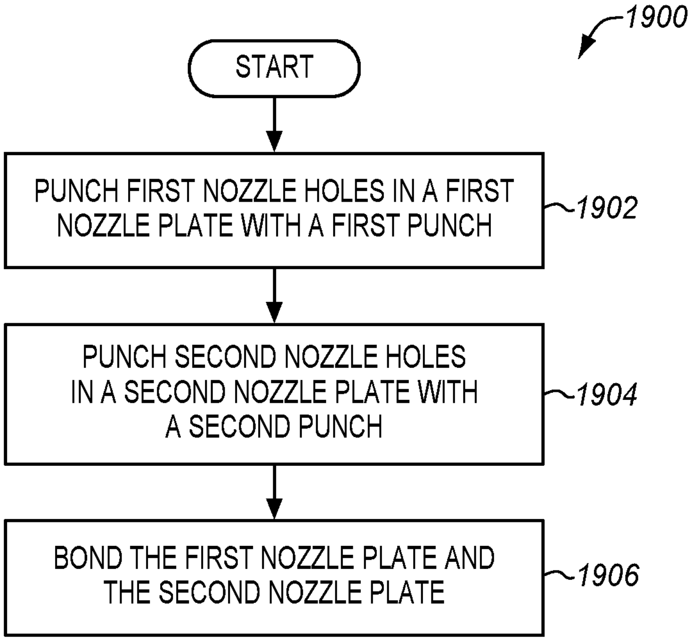
FIG. 19 is a flow chart illustrating a method of fabricating a nozzle plate stack in an illustrative embodiment.

FIG. 19 is a flow chart illustrating a method 1900 of fabricating a nozzle plate stack 1736 in an illustrative embodiment. The steps of method 1900 will be described with respect to fabrication system 1700 of FIG. 17, although one skilled in the art will understand that the methods described herein may be performed by other types of systems. The steps of the methods described herein are not all inclusive and may include other steps not shown. The steps for the flow charts shown herein may also be performed in an alternative order.

Figure 20:
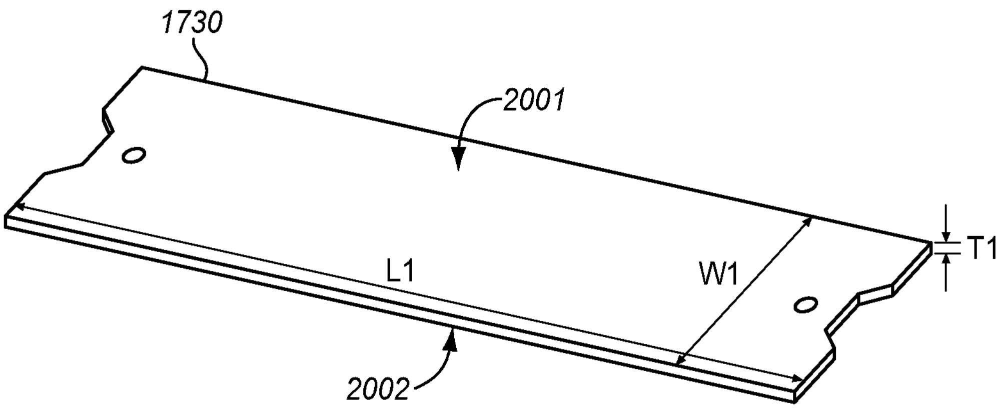
FIG. 20 is a perspective view of a blank nozzle plate in an illustrative embodiment.

To begin, a nozzle plate 1730 is obtained and loaded/registered on punch press 1702. At this point, nozzle plate 1730 may be considered "blank" as it has not yet been punched with holes for nozzles. FIG. 20 is a perspective view of a blank nozzle plate 1730 in an illustrative embodiment. Nozzle plate 1730 is a thin sheet of material that is generally rectangular in shape and is substantially flat. Nozzle plate 1730 may be made from a metal material (e.g., stainless steel, copper, alloys, etc.), a synthetic material (e.g., plastic), or another type of material. Nozzle plate 1730 has a first side 2001 and a second side 2002 opposite the first side 2001 that define the major surfaces of nozzle plate 1730. Nozzle plate 1730 has a dimension indicated by a width (W1), a length (L1), and a thickness (T1). The thickness of nozzle plate 1730 may be in the range of about 50 μm to 150 μm. Other nozzle plates 1731 described herein may be similar to nozzle plate 1730 shown in FIG. 20. However, the thicknesses of the individual nozzle plates may vary as desired.

In FIG. 19, punch press 1702 punches a plurality of nozzle holes 1740 in nozzle plate 1730 with nozzle punch 1710 (step 1902). A nozzle hole comprises a hole in a nozzle plate that forms a portion of a nozzle of a printhead. In one embodiment, nozzle punch 1710 may be configured to punch nozzle holes 1740 one at a time. Thus, punch press 1702 may sequentially punch the nozzle holes 1740 in nozzle plate 1730 in one or more rows to correspond with one or more rows of nozzles desired for the printhead. In another embodiment, nozzle punch 1710 may be configured to punch multiple nozzle holes 1740 simultaneously (i.e., at the same time). As will be described in more detail below, each of the nozzle holes 1740 punched in nozzle plate 1730 includes a converging section. After punching is completed, the nozzle plate 1730 may be unloaded from punch press 1702, and transferred to another tool, such as bonding tool 1704.

Another nozzle plate 1731 is obtained and loaded/registered on punch press 1702. At this point, nozzle plate 1731 may also be considered "blank" as it has not yet been punched with holes for nozzles. Punch press 1702 punches a plurality of nozzle holes 1741 in nozzle plate 1731 with nozzle punch 1711 (step 1904). In one embodiment, nozzle punch 1711 may be configured to punch nozzle holes 1741 one at a time. Thus, punch press 1702 may sequentially punch the nozzle holes 1741 in nozzle plate 1731 in one or more rows to correspond with one or more rows of nozzles desired for the printhead. In another embodiment, nozzle punch 1711 may be configured to punch multiple nozzle holes 1741 simultaneously (i.e., at the same time). As will be described in more detail below, each of the nozzle holes 1741 punched in nozzle plate 1731 includes a converging section. After punching is completed, the nozzle plate 1731 may be unloaded from punch press 1702, and transferred to another tool, such as bonding tool 1704.

Nozzle plates 1730-1731 are loaded or registered on bonding tool 1704. When loaded on bonding tool 1704, the nozzle holes 1740 in nozzle plate 1730 are aligned with the nozzle holes 1741 in nozzle plate 1731, with the first side 2001 of nozzle plate 1731 facing the second side 2002 of nozzle plate 1730. Bonding tool 1704 bonds nozzle plate 1730 and nozzle plate 1731 to form nozzle plate stack 1736 (step 1906). For example, bonding tool 1704 may use an adhesive or the like, along with heat, pressure, etc., to bond nozzle plates 1730-1731 together into a laminated stack. Thus, the first side 2001 of nozzle plate 1731 is bonded to the second side 2002 of nozzle plate 1730. When bonded, nozzle holes 1740 in nozzle plate 1730 and nozzle holes 1741 in nozzle plate 1731 define nozzles of the printhead.

In the above embodiment, two nozzle plates 1730-1731 were punched and bonded to form nozzle plate stack 1736. However, more than two nozzle plates 1730-1731 may be punched and bonded to form nozzle plate stack 1736 in other embodiments. Also, bonding tool 1704 may bond nozzle plates 1730-1731 along with other plates, such as restrictor plates 321/324, chamber plates 322-323, a diaphragm plate 320, etc., to form a plate stack 232 for a printhead.

Figure 21:
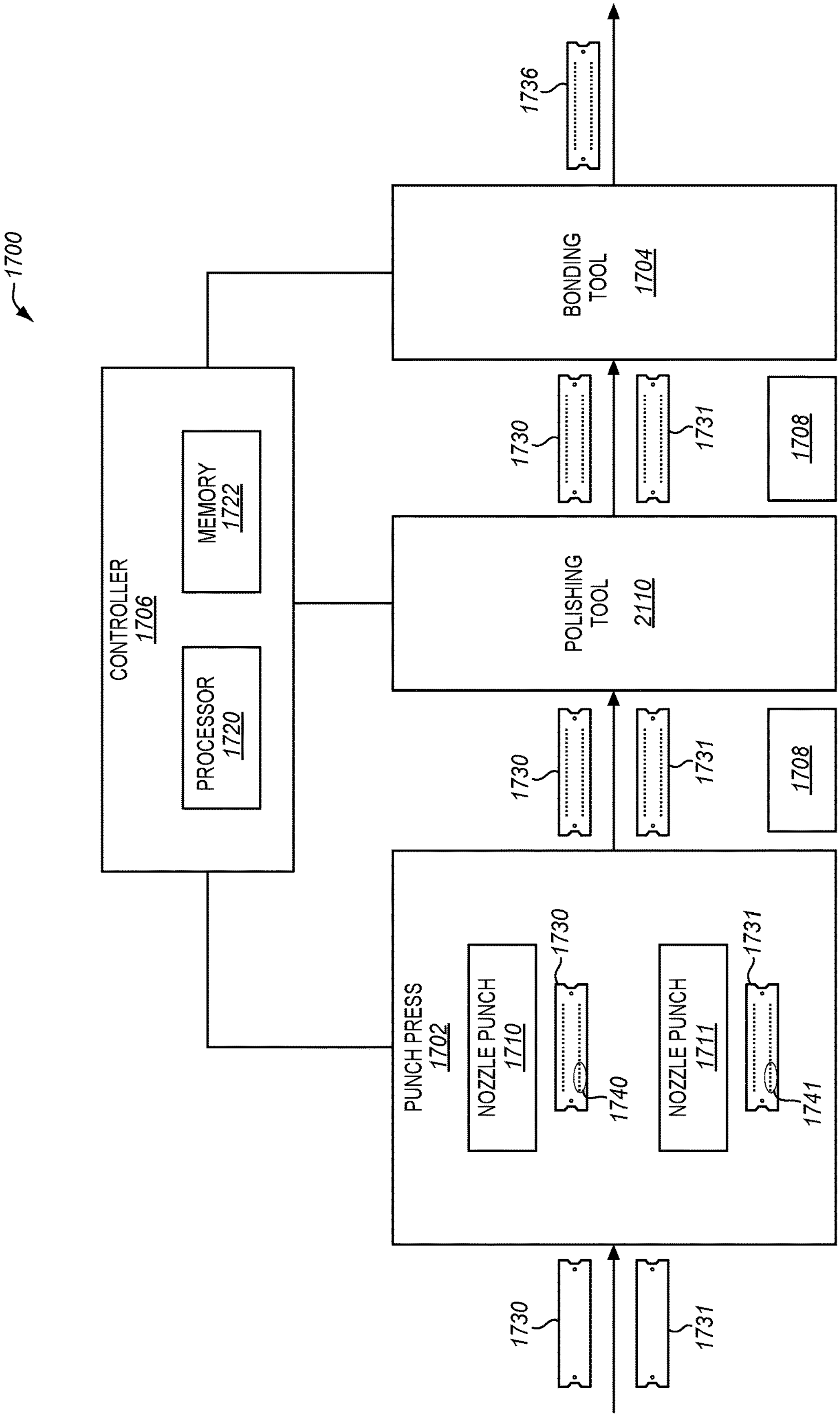
FIG. 21 is a block diagram of a fabrication system in another illustrative embodiment.

Depending on the set up of nozzle punches 1710-1711 and/or die 1802 (see FIG. 18), the punching process performed by punch press 1702 may result in material projecting from one side of nozzle plates 1730-1731 around the holes that are formed in the nozzle plates 1730-1731, which may be referred to as herein as extrusions, burrs, etc. Thus, nozzle plates 1730-1731 may be polished after being punched and before bonding. FIG. 21 is a block diagram of a fabrication system 1700 in another illustrative embodiment. In this embodiment, fabrication system 1700 further includes a polishing tool 2110. Polishing tool 2110 is a type of device that smoothes and/or removes material from a surface of a workpiece to increase the flatness of the surface or of features projecting from the surface. Polishing tool 2110 may use mechanical forces from a polishing pad, an abrasive pad, or the like for smoothing or planarization of the surface. Polishing tool 2110 may also use mechanical forces in combination with chemical forces for smoothing or planarization of the surface, such as with Chemical-Mechanical Polishing (CMP). Polishing tool 2110 may use other types of material-removal processes as desired.

Figure 22:
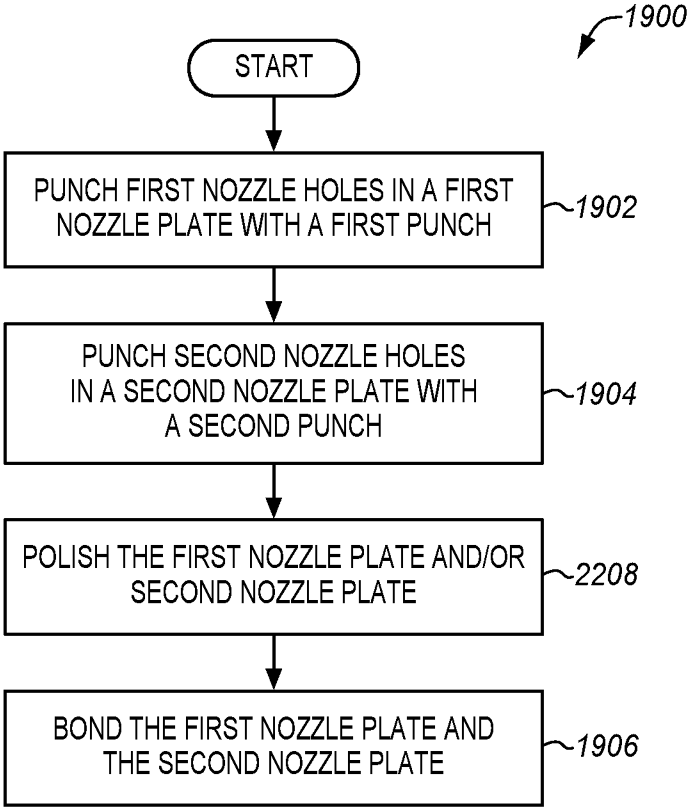
FIG. 22 is a flow chart illustrating an additional step of the method in FIG. 19 in an illustrative embodiment.

FIG. 22 is a flow chart illustrating an additional step of method 1900 in an illustrative embodiment. In this embodiment, when nozzle holes 1740 are punched from a first side 2001 through a second side 2002 of nozzle plate 1730, extrusions may result on the second side 2002 of nozzle plate 1730 around the nozzle holes 1740. Thus after punching, nozzle plate 1730 may be loaded or registered on polishing tool 2110. Polishing tool 2110 polishes the second side 2002 of nozzle plate 1730 (step 2208) to form a planar surface on the second side 2002 of nozzle plate 1730 prior to bonding. The second side 2002 of nozzle plate 1730 is a bonding surface that will be bonded to nozzle plate 1731 by bonding tool 1704, and it is beneficial to planarize the second side 2002 of nozzle plate 1730 to improve bonding. In another embodiment, polishing tool 2110 may also polish the first side 2001 of nozzle plate 1730 (step 2208) to form a planar surface on the first side 2001 of nozzle plate 1730 prior to the bonding.

Similarly, when nozzle holes 1741 are punched from a first side 2001 through a second side 2002 of nozzle plate 1731, extrusions may result on the second side 2002 of nozzle plate 1731 around the nozzle holes 1741. The second side 2002 of nozzle plate 1731 will represent the bottom surface or discharge surface of the printhead (i.e., the surface facing the medium from which print fluid is jetted). After punching, nozzle plate 1731 may be loaded or registered on polishing tool 2110. Polishing tool 2110 polishes the second side 2002 of nozzle plate 1731 (step 2208) prior to bonding. In one embodiment, polishing tool 2110 may polish the second side 2002 of nozzle plate 1731 to form a planar surface on the second side 2002 of nozzle plate 1731. In another embodiment, polishing tool 2110 may polish the second side 2002 of nozzle plate 1731 to remove a portion of the extrusions and leave surface features around nozzle holes 1741 that define orifices of the nozzles where a print fluid exits the nozzles. Any of the above steps of method 1900 may be performed by controller 1706 controlling operations of fabrication system 1700 according to instructions stored in memory 1722.

Figure 23:
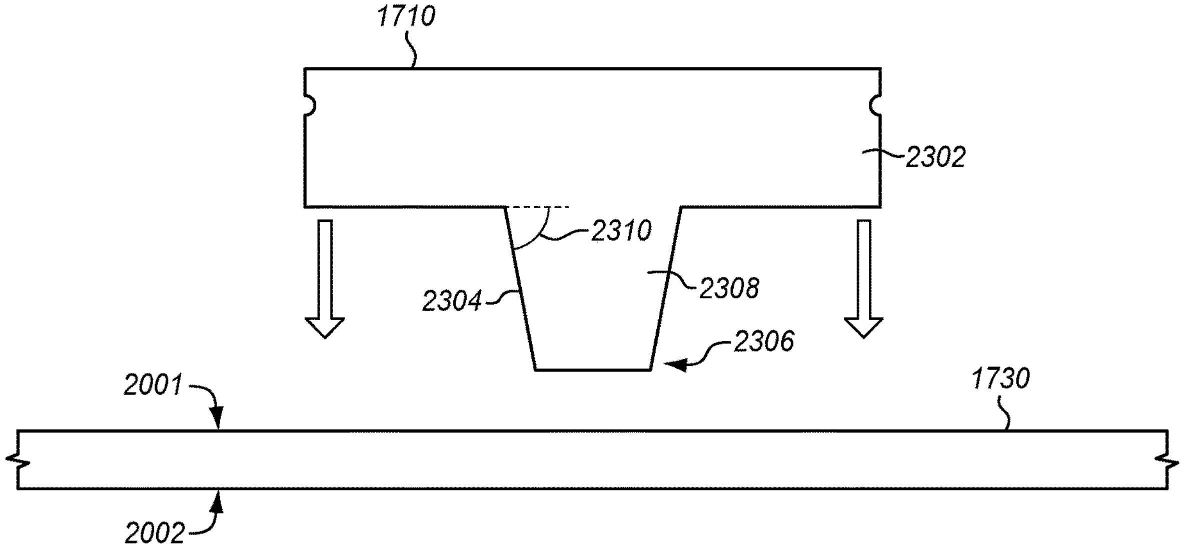
FIG. 23 illustrates a nozzle punch and a nozzle plate in an illustrative embodiment.

The following examples further illustrate fabrication of a nozzle plate stack 1736. In one embodiment, FIGS. 23-33 illustrate fabrication of a nozzle plate stack 1736 where the geometry of the nozzles resembles FIG. 13 described above. A blank nozzle plate 1730 is loaded onto punch press 1702 where nozzle holes 1740 are formed in nozzle plate 1730 with nozzle punch 1710. FIG. 23 illustrates a nozzle punch 1710 and a nozzle plate 1730 in an illustrative embodiment. Nozzle punch 1710 includes a body 2302 that couples to punch holder 1810 of punch press 1702, and a head 2304 that projects from body 2302. Head 2304 is the member of nozzle punch 1710 that forms a nozzle hole 1740 in a nozzle plate 1730. The shape or dimensions of head 2304 therefore defines the shape or dimensions of nozzle hole 1740. Along a length of head 2304 from body 2302 to tip 2306, head 2304 includes a converging portion 2308 that is generally cone-shaped, and converges or tapers toward tip 2306. Thus, the diameter of converging portion 2308 decreases or gets progressively smaller at a convergence angle 2310. Although not shown, tip 2306 may include a point, a cutting edge, etc., to facilitate punching a hole in a nozzle plate.

Figure 24:
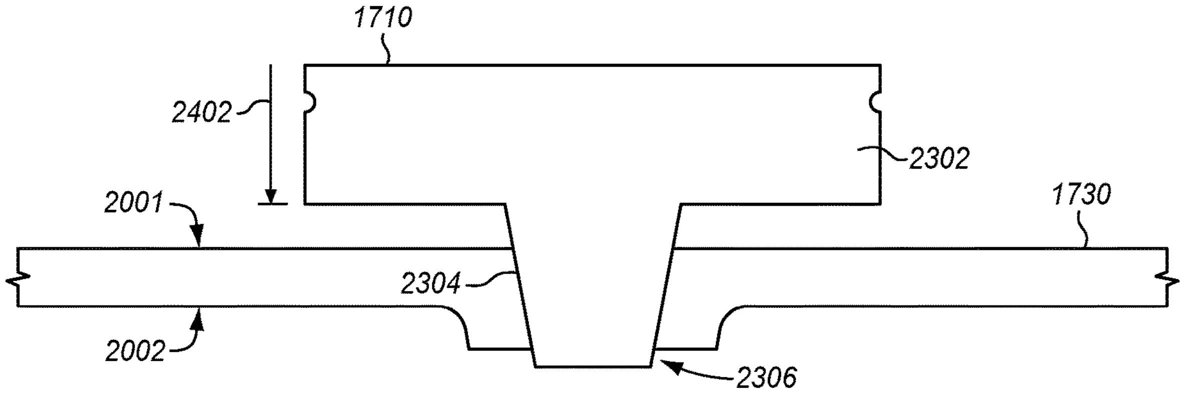
FIG. 24 illustrates a nozzle punch pressed into a nozzle plate in an illustrative embodiment.
Figure 25:
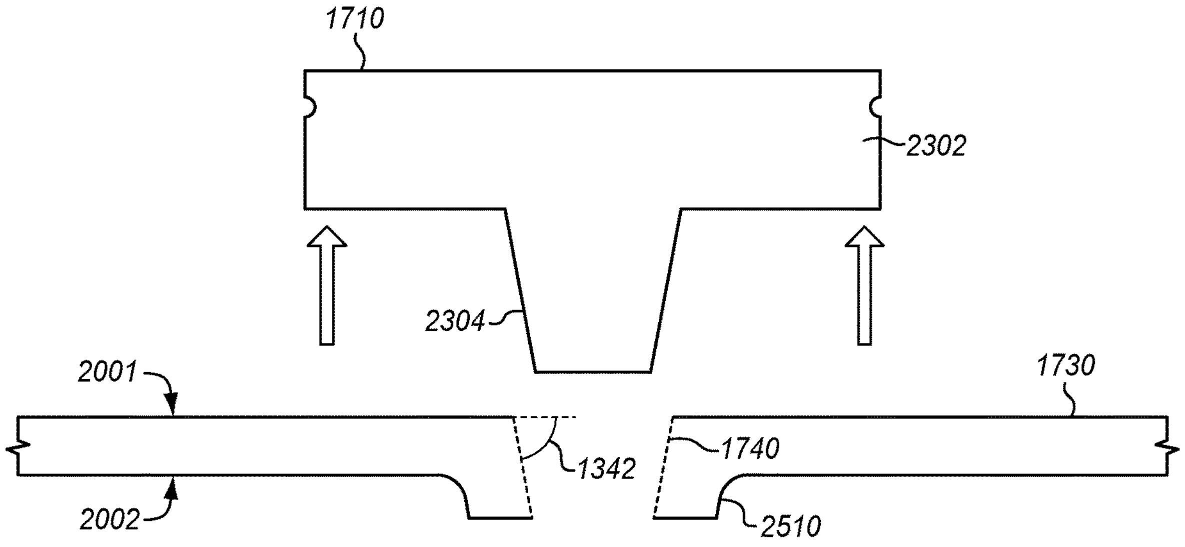
FIG. 25 illustrates a nozzle punch withdrawn from a nozzle plate in an illustrative embodiment.

Punch press 1702 forces nozzle punch 1710 through nozzle plate 1730 from side 2001 to create a nozzle hole 1740. FIG. 24 illustrates nozzle punch 1710 pressed into nozzle plate 1730 in an illustrative embodiment. Punch press 1702 forces the head 2304 of nozzle punch 1710 through nozzle plate 1730 based on a controllable stroke length 2402, with the tip 2306 of nozzle punch 1710 at least partially extending through side 2002 of nozzle plate 1730. Punch press 1702 then withdraws nozzle punch 1710 from nozzle plate 1730. FIG. 25 illustrates nozzle punch 1710 withdrawn from nozzle plate 1730 in an illustrative embodiment. The punching process forms a nozzle hole 1740 through the thickness (T1) of nozzle plate 1730 from side 2001 to side 2002. Nozzle hole 1740 has a convergence angle 1342 matching the convergence angle 2310 of head 2304. Punch press 1702 may repeat this process to form a plurality of nozzle holes 1740 in nozzle plate 1730.

Figure 26:
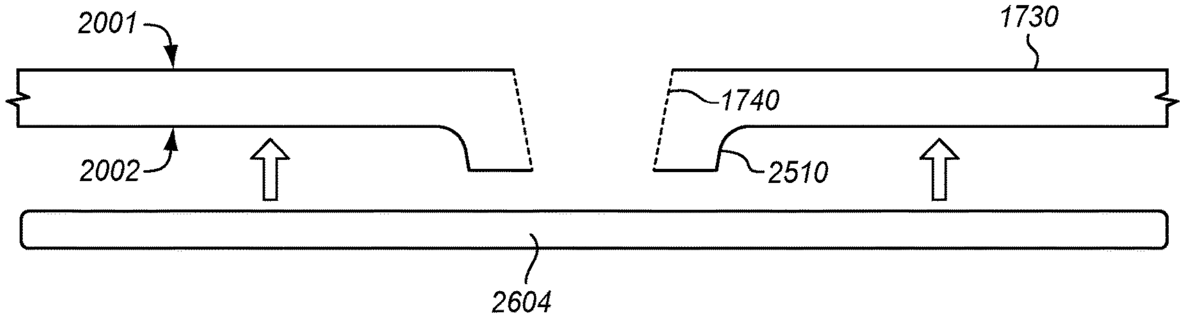
FIG. 26 illustrates polishing of a nozzle plate in an illustrative embodiment.
Figure 27:
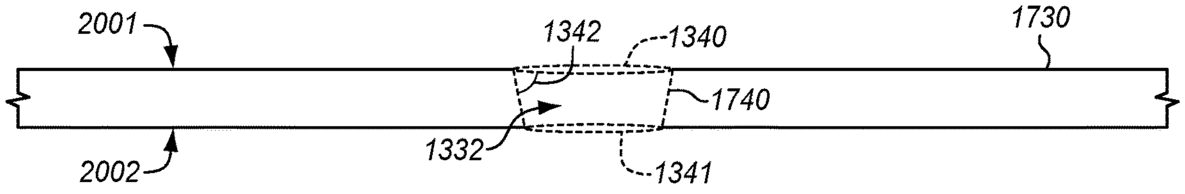
FIG. 27 illustrates a nozzle plate after polishing in an illustrative embodiment.

Punching may result in an extrusion 2510 surrounding nozzle hole 1740 on side 2002. Side 2002 of nozzle plate 1730 will subsequently be bonded to another nozzle plate, so it may be desirable to form a planar surface on side 2002 with polishing tool 2110. FIG. 26 illustrates polishing of nozzle plate 1730 in an illustrative embodiment. Polishing tool 2110 is represented in FIG. 26 generally by a polishing pad 2604 that polishes side 2002 of nozzle plate 1730. It is noted that polishing tool 2110 may also polish side 2001 of nozzle plate 1730 if desired. FIG. 27 illustrates nozzle plate 1730 after polishing in an illustrative embodiment. Polishing removes extrusion 2510 and forms a planar surface on side 2002 of nozzle plate 1730, and the dimensions of nozzle hole 1740 are defined. As in FIG. 13, nozzle hole 1740 includes a first converging section 1332 having a cone shape that tapers or angles from end 1340 to end 1341 so that the diameter of first converging section 1332 decreases from end 1340 to end 1341.

Figure 28:
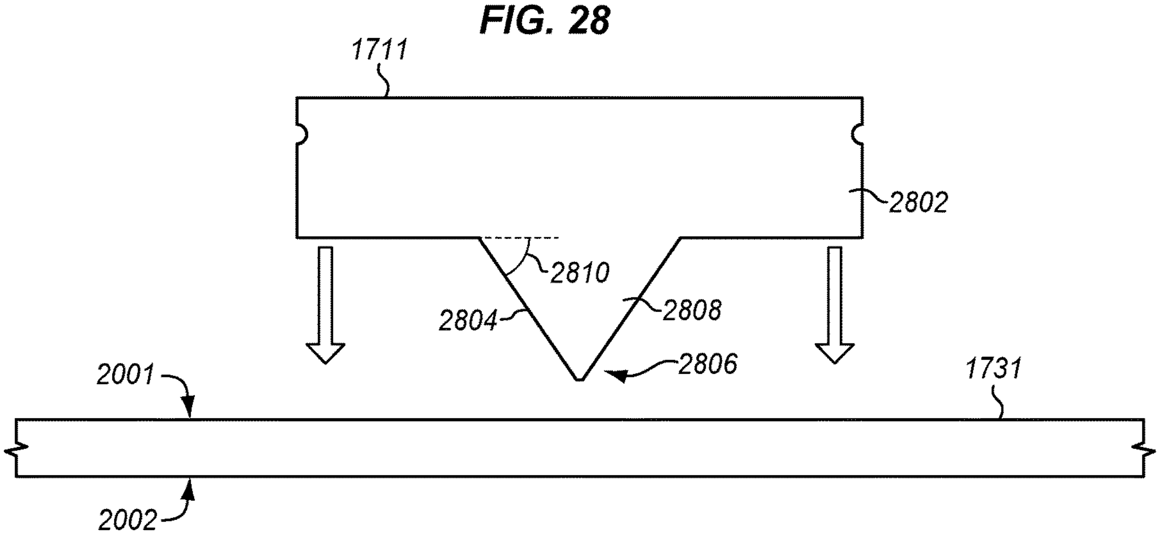
FIG. 28 illustrates a nozzle punch and a nozzle plate in an illustrative embodiment.

A blank nozzle plate 1731 is loaded onto punch press 1702 where nozzle holes 1741 are formed in nozzle plate 1731 with nozzle punch 1711. FIG. 28 illustrates a nozzle punch 1711 and a nozzle plate 1731 in an illustrative embodiment. Nozzle punch 1711 includes a body 2802 that couples to punch holder 1810 of punch press 1702, and a head 2804 that projects from body 2802. Along a length of head 2804 from body 2802 to tip 2806, head 2804 includes a converging portion 2808 that is generally cone-shaped, and converges or tapers toward tip 2806. Thus, the diameter of converging portion 2808 decreases or gets progressively smaller at a convergence angle 2810. In this embodiment, the convergence angle 2810 of the head 2804 of nozzle punch 1711 is different (i.e., greater) than the convergence angle 2310 of the head 2304 of nozzle punch 1710 as shown in FIG. 23. Although not shown, tip 2806 may include a point, a cutting edge, etc., to facilitate punching a hole in a nozzle plate.

Figure 29:
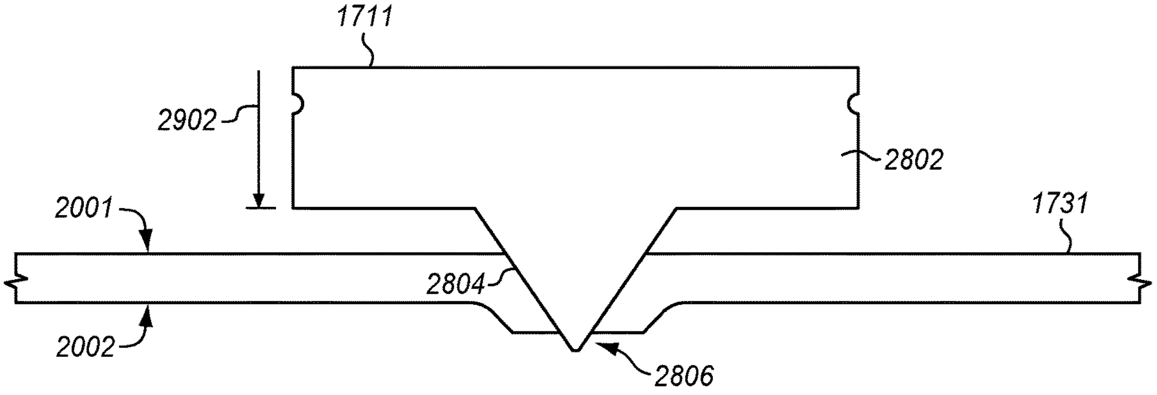
FIG. 29 illustrates a nozzle punch pressed into a nozzle plate in an illustrative embodiment.
Figure 30:
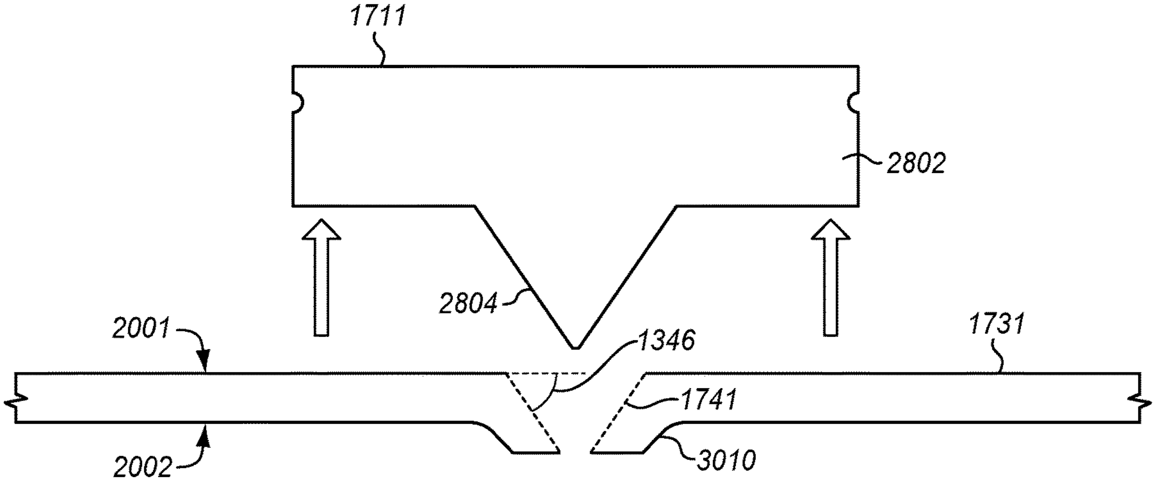
FIG. 30 illustrates a nozzle punch withdrawn from a nozzle plate in an illustrative embodiment.

Punch press 1702 forces nozzle punch 1711 through nozzle plate 1731 from side 2001 to create a nozzle hole 1741. FIG. 29 illustrates nozzle punch 1711 pressed into nozzle plate 1731 in an illustrative embodiment. Punch press 1702 forces the head 2804 of nozzle punch 1711 through nozzle plate 1731 based on a controllable stroke length 2902, with the tip 2806 of nozzle punch 1711 at least partially extending through side 2002 of nozzle plate 1731. Punch press 1702 then withdraws nozzle punch 1711 from nozzle plate 1731. FIG. 30 illustrates nozzle punch 1711 withdrawn from nozzle plate 1731 in an illustrative embodiment. The punching process forms a nozzle hole 1741 through the thickness (T1) of nozzle plate 1731 from side 2001 to side 2002. Nozzle hole 1741 has a convergence angle 1346 matching the convergence angle 2810 of head 2804. Punch press 1702 may repeat this process to form a plurality of nozzle holes 1741 in nozzle plate 1731.

Figure 31:
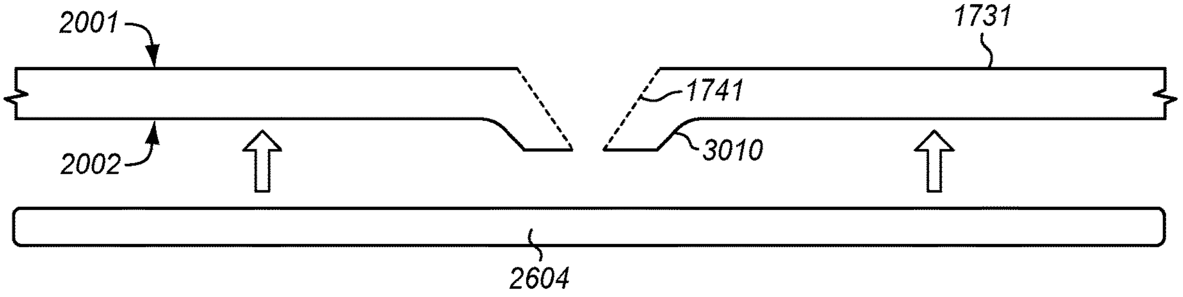
FIG. 31 illustrates polishing of a nozzle plate in an illustrative embodiment.
Figure 32:
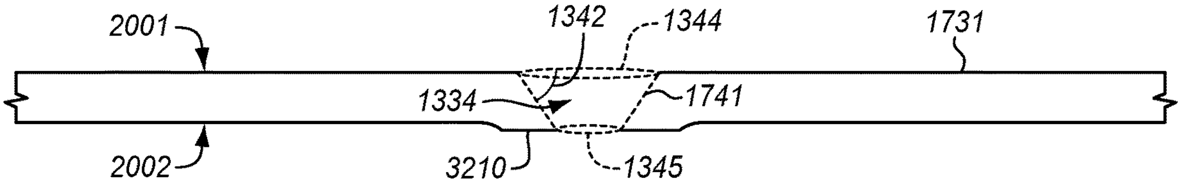
FIG. 32 illustrates a nozzle plate after polishing in an illustrative embodiment.

Punching may result in an extrusion 3010 surrounding nozzle hole 1741 on side 2002. Side 2002 of nozzle plate 1731 represents the discharge surface of a printhead where a print fluid is jetted out of the printhead. Thus, side 2002 of nozzle plate 1731 may be polished to define the orifice of a nozzle. FIG. 31 illustrates polishing of nozzle plate 1731 in an illustrative embodiment. Polishing tool 2110 is represented in FIG. 31 generally by a polishing pad 2604 that polishes side 2002 of nozzle plate 1731. It is noted that polishing tool 2110 may also polish side 2001 of nozzle plate 1731 if desired. FIG. 32 illustrates nozzle plate 1731 after polishing in an illustrative embodiment. After polishing in this embodiment, a portion of extrusion 3010 is removed, leaving a surface feature 3210 that projects from side 2002 around nozzle hole 1741. Polishing defines the orifice of the nozzle where a print fluid exits the nozzle at an end of nozzle hole 1741. Nozzle hole 1741 includes a second converging section 1334 having a cone shape that tapers or angles from end 1344 to end 1345 so that the diameter of second converging section 1334 decreases from end 1344 to end 1345. The diameter of second converging section 1334 at end 1344 is generally the same as or equivalent to the diameter of first converging section 1332 at end 1341 (see FIG. 27). The diameter of second converging section 1334 at end 1345 defines the orifice of a nozzle, which is circular.

Figure 33:
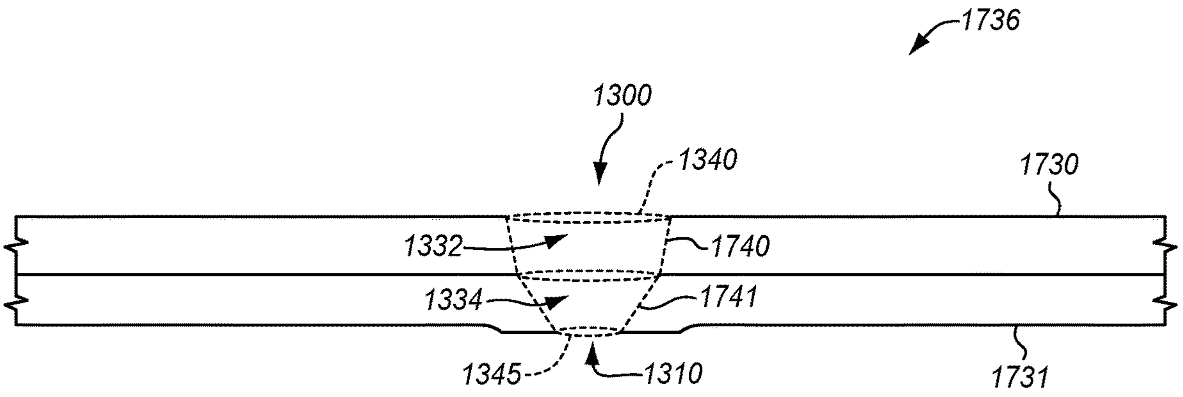
FIG. 33 illustrates a nozzle plate stack in an illustrative embodiment.

With nozzle plates 1730-1731 punched and polished as desired, nozzle plates 1730-1731 may be loaded onto bonding tool 1704, which bonds the nozzle plates 1730-1731 to form a nozzle plate stack 1736. FIG. 33 illustrates a nozzle plate stack 1736 in an illustrative embodiment. When bonded, nozzle hole 1740 of nozzle plate 1730 and nozzle hole 1741 of nozzle plate 1731 define a nozzle 1300 of a printhead as shown in FIG. 13. End 1340 of first converging section 1332 is the entrance of nozzle 1300, and end 1345 of second converging section 1334 is the exit or orifice 1310 of nozzle 1300. From the entrance to orifice 1310 along its length, nozzle 1300 is comprised of first converging section 1332 and second converging section 1334 that abuts or adjoins first converging section 1332. First converging section 1332 has a diameter that decreases in the flow direction of print fluid through nozzle 1300, and second converging section 1334 has a diameter that decreases in the flow direction at a different angle than the first converging section 1332.

Figure 34:
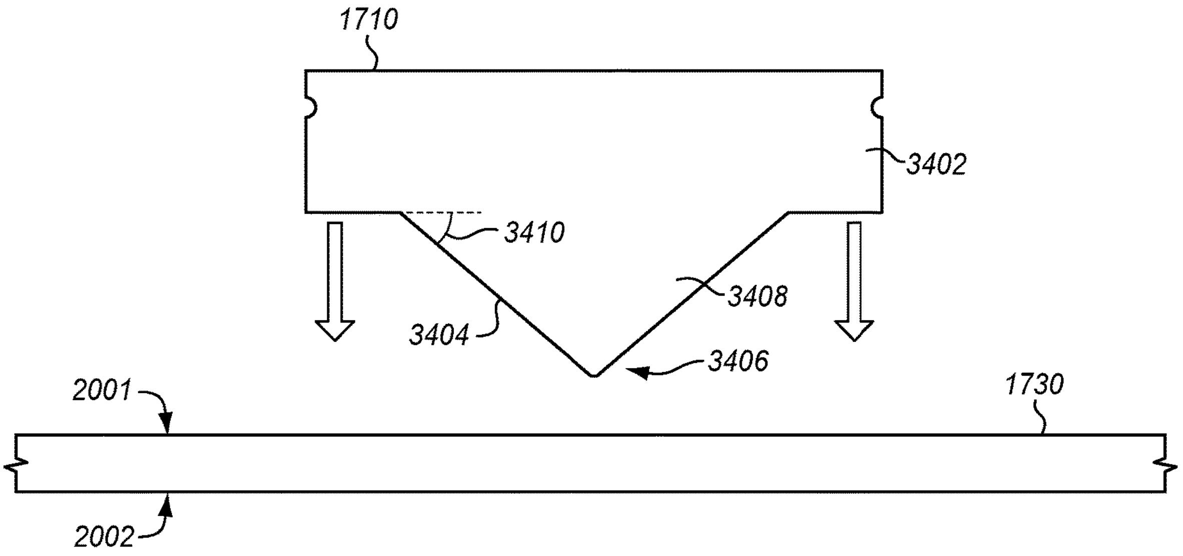
FIG. 34 illustrates a nozzle punch and a nozzle plate in an illustrative embodiment.

In another embodiment, FIGS. 34-44 illustrate fabrication of a nozzle plate stack 1736 where the geometry of the nozzles resembles FIG. 15 described above. A blank nozzle plate 1730 is loaded onto punch press 1702 where nozzle holes 1740 are formed in nozzle plate 1730 with nozzle punch 1710. FIG. 34 illustrates a nozzle punch 1710 and a nozzle plate 1730 in an illustrative embodiment. Nozzle punch 1710 includes a body 3402 that couples to punch holder 1810 of punch press 1702, and a head 3404 that projects from body 3402. Along a length of head 3404 from body 3402 to tip 3406, head 3404 includes a converging portion 3408 that is generally cone-shaped, and converges or tapers toward tip 3406. Thus, the diameter of converging portion 3408 decreases or gets progressively smaller at a convergence angle 3410. Although not shown, tip 3406 may include a point, a cutting edge, etc., to facilitate punching a hole in a nozzle plate.

Figure 35:
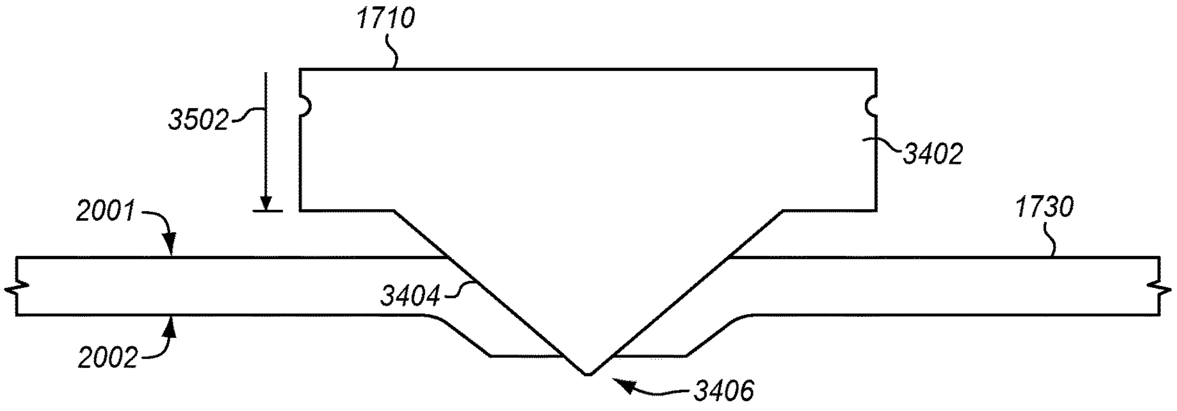
FIG. 35 illustrates a nozzle punch pressed into a nozzle plate in an illustrative embodiment.
Figure 36:
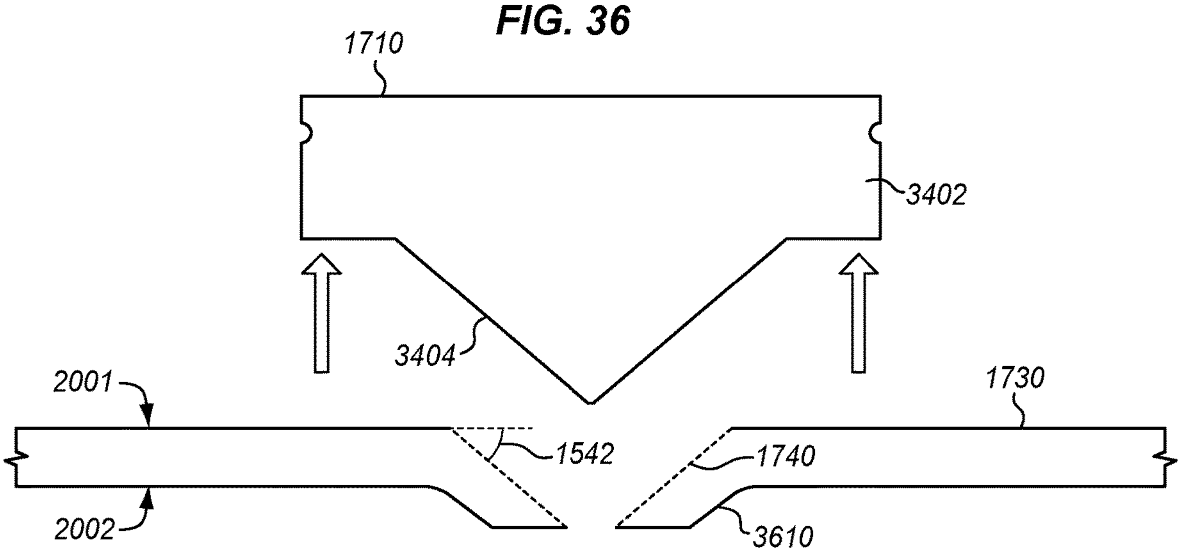
FIG. 36 illustrates a nozzle punch withdrawn from a nozzle plate in an illustrative embodiment.

Punch press 1702 forces nozzle punch 1710 through nozzle plate 1730 from side 2001 to create a nozzle hole 1740. FIG. 35 illustrates nozzle punch 1710 pressed into nozzle plate 1730 in an illustrative embodiment. Punch press 1702 forces the head 3404 of nozzle punch 1710 through nozzle plate 1730 based on a controllable stroke length 3502, with the tip 3406 of nozzle punch 1710 at least partially extending through side 2002 of nozzle plate 1730. Punch press 1702 then withdraws nozzle punch 1710 from nozzle plate 1730. FIG. 36 illustrates nozzle punch 1710 withdrawn from nozzle plate 1730 in an illustrative embodiment. The punching process forms a nozzle hole 1740 through the thickness (T1) of nozzle plate 1730 from side 2001 to side 2002. Nozzle hole 1740 has a convergence angle 1542 matching the convergence angle 3410 of head 3404. Punch press 1702 may repeat this process to form a plurality of nozzle holes 1740 in nozzle plate 1730.

Figure 37:
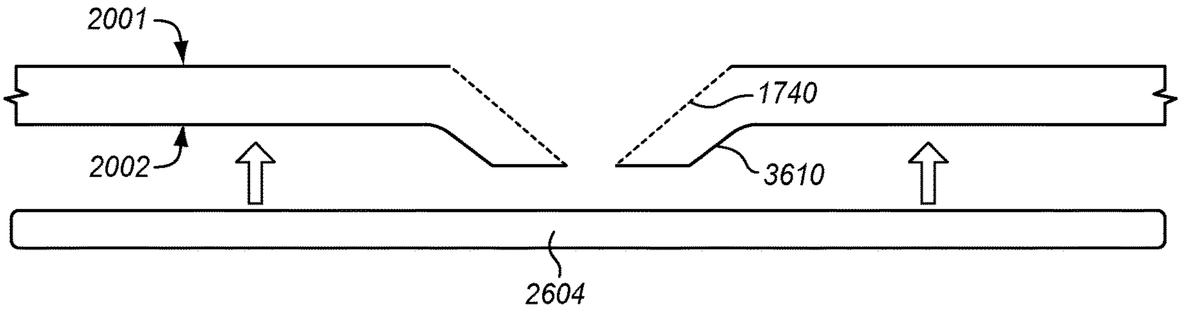
FIG. 37 illustrates polishing of a nozzle plate in an illustrative embodiment.
Figure 38:
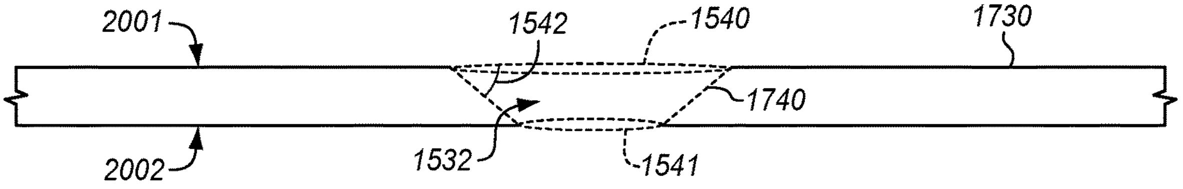
FIG. 38 illustrates a nozzle plate after polishing in an illustrative embodiment.

Punching may result in an extrusion 3610 surrounding nozzle hole 1740 on side 2002. Side 2002 of nozzle plate 1730 will subsequently be bonded to another nozzle plate, so it may be desirable to form a planar surface on side 2002 with polishing tool 2110. FIG. 37 illustrates polishing of nozzle plate 1730 in an illustrative embodiment. Polishing tool 2110 is represented in FIG. 37 generally by a polishing pad 2604 that polishes side 2002 of nozzle plate 1730. It is noted that polishing tool 2110 may also polish side 2001 of nozzle plate 1730 if desired. FIG. 38 illustrates nozzle plate 1730 after polishing in an illustrative embodiment. Polishing removes extrusion 3610 and forms a planar surface on side 2002 of nozzle plate 1730, and the dimensions of nozzle hole 1740 are defined. As in FIG. 15, nozzle hole 1740 includes a first converging section 1532 having a cone shape that tapers or angles from end 1540 to end 1541 so that the diameter of first converging section 1532 decreases from end 1540 to end 1541.

Figure 39:
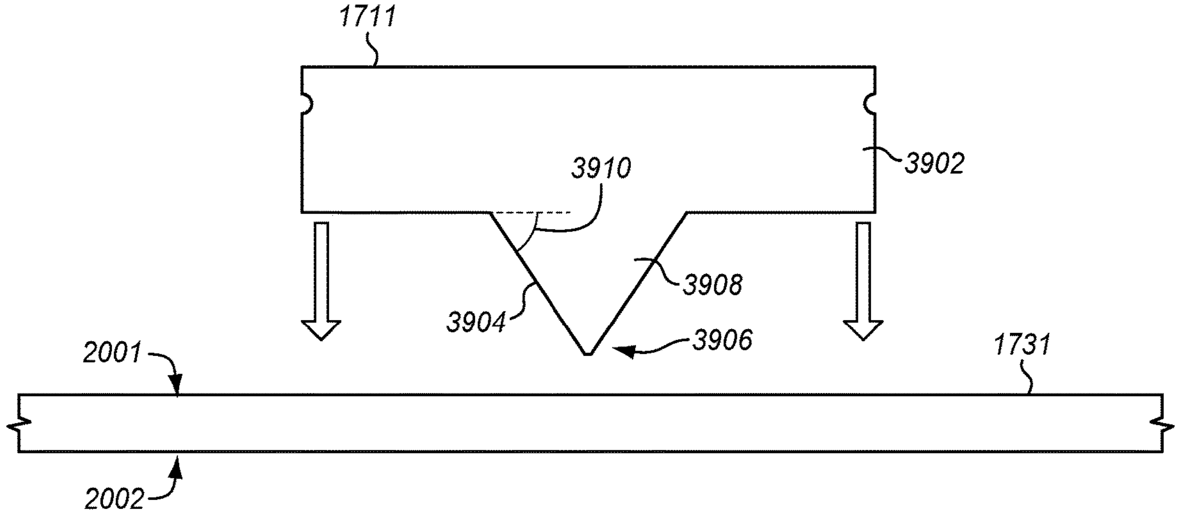
FIG. 39 illustrates a nozzle punch and a nozzle plate in an illustrative embodiment.

A blank nozzle plate 1731 is loaded onto punch press 1702 where nozzle holes 1741 are formed in nozzle plate 1731 with nozzle punch 1711. FIG. 39 illustrates a nozzle punch 1711 and a nozzle plate 1731 in an illustrative embodiment. Nozzle punch 1711 includes a body 3902 that couples to punch holder 1810 of punch press 1702, and a head 3904 that projects from body 3902. Along a length of head 3904 from body 3902 to tip 3906, head 3904 includes a converging portion 3908 that is generally cone-shaped, and converges or tapers toward tip 3906. Thus, the diameter of converging portion 3908 decreases or gets progressively smaller at a convergence angle 3910. In this embodiment, the convergence angle 3910 of the head 3904 of nozzle punch 1711 is different (i.e., less) than the convergence angle 3410 of the head 3404 of nozzle punch 1710 as shown in FIG. 34. Although not shown, tip 3906 may include a point, a cutting edge, etc., to facilitate punching a hole in a nozzle plate.

Figure 40:
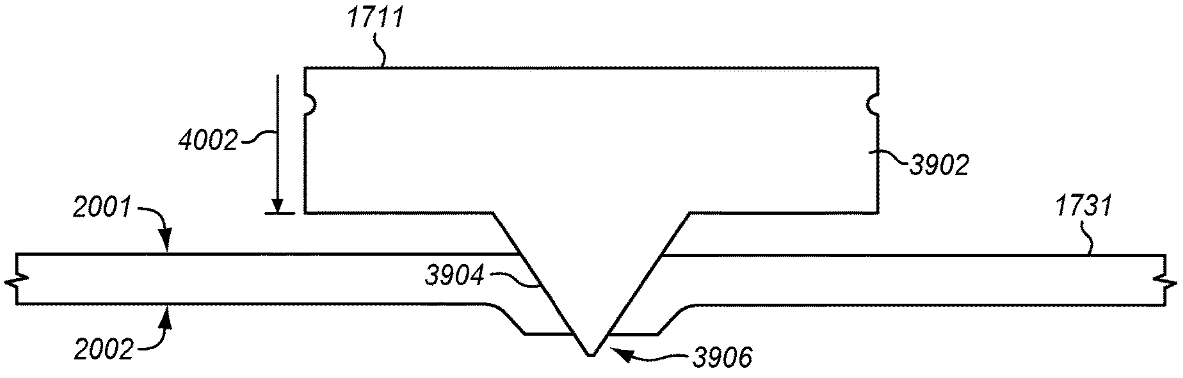
FIG. 40 illustrates a nozzle punch pressed into a nozzle plate in an illustrative embodiment.
Figure 41:
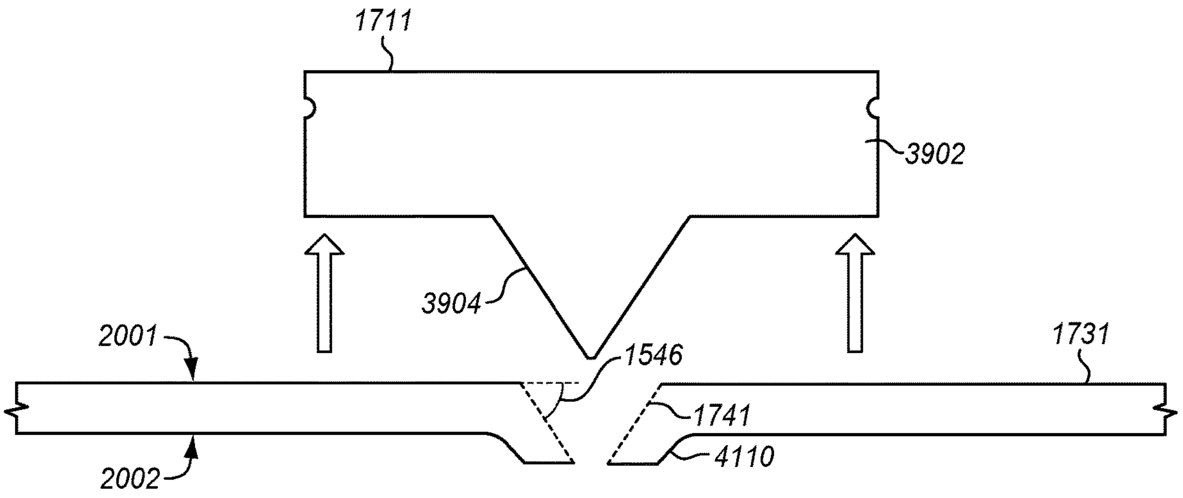
FIG. 41 illustrates a nozzle punch withdrawn from a nozzle plate in an illustrative embodiment.

Punch press 1702 forces nozzle punch 1711 through nozzle plate 1731 from side 2001 to create a nozzle hole 1741. FIG. 40 illustrates nozzle punch 1711 pressed into nozzle plate 1731 in an illustrative embodiment. Punch press 1702 forces the head 3904 of nozzle punch 1711 through nozzle plate 1731 based on a controllable stroke length 4002, with the tip 3906 of nozzle punch 1711 at least partially extending through side 2002 of nozzle plate 1731. Punch press 1702 then withdraws nozzle punch 1711 from nozzle plate 1731. FIG. 41 illustrates nozzle punch 1711 withdrawn from nozzle plate 1731 in an illustrative embodiment. The punching process forms a nozzle hole 1741 through the thickness (T1) of nozzle plate 1731 from side 2001 to side 2002. Nozzle hole 1741 has a convergence angle 1546 matching the convergence angle 3910 of head 3904. Punch press 1702 may repeat this process to form a plurality of nozzle holes 1741 in nozzle plate 1731.

Figure 42:
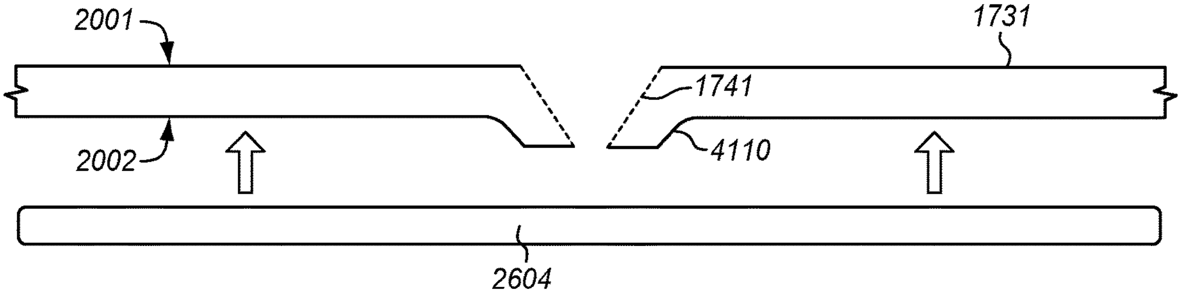
FIG. 42 illustrates polishing of a nozzle plate in an illustrative embodiment.
Figure 43:
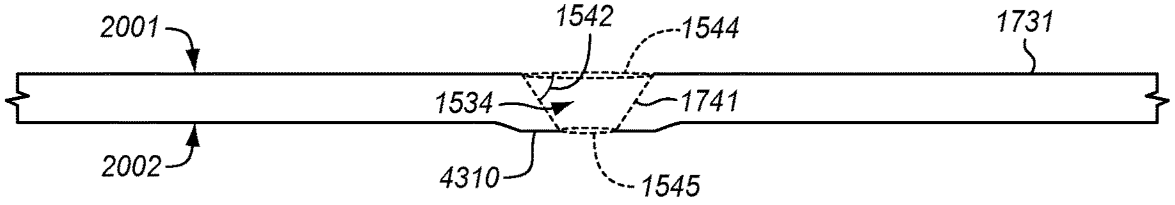
FIG. 43 illustrates a nozzle plate after polishing in an illustrative embodiment.

Punching may result in an extrusion 4110 surrounding nozzle hole 1741 on side 2002. Side 2002 of nozzle plate 1731 represents the discharge surface of a printhead where a print fluid is jetted out of the printhead. Thus, side 2002 of nozzle plate 1731 may be polished to define the orifice of a nozzle. FIG. 42 illustrates polishing of nozzle plate 1731 in an illustrative embodiment. Polishing tool 2110 is represented in FIG. 42 generally by a polishing pad 2604 that polishes side 2002 of nozzle plate 1731. It is noted that polishing tool 2110 may also polish side 2001 of nozzle plate 1731 if desired. FIG. 43 illustrates nozzle plate 1731 after polishing in an illustrative embodiment. After polishing in this embodiment, a portion of extrusion 4110 is removed, leaving a surface feature 4310 that projects from side 2002 around nozzle hole 1741. Polishing defines the orifice of the nozzle where a print fluid exits the nozzle at an end of nozzle hole 1741. Nozzle hole 1741 includes a second converging section 1534 having a cone shape that tapers or angles from end 1544 to end 1545 so that the diameter of second converging section 1534 decreases from end 1544 to end 1545. The diameter of second converging section 1534 at end 1544 is generally the same as or equivalent to the diameter of first converging section 1532 at end 1541 (see FIG. 38). The diameter of second converging section 1534 at end 1545 defines the orifice of a nozzle, which is circular.

Figure 44:
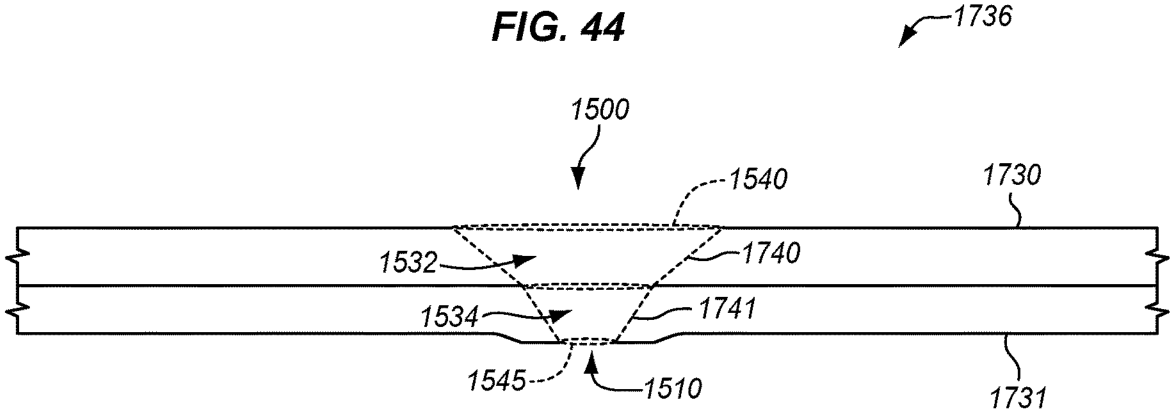
FIG. 44 illustrates a nozzle plate stack in an illustrative embodiment.

With nozzle plates 1730-1731 punched and polished as desired, nozzle plates 1730-1731 may be loaded onto bonding tool 1704, which bonds the nozzle plates 1730-1731 to form a nozzle plate stack 1736. FIG. 44 illustrates a nozzle plate stack 1736 in an illustrative embodiment. When bonded, nozzle hole 1740 of nozzle plate 1730 and nozzle hole 1741 of nozzle plate 1731 define a nozzle 1500 of a printhead as shown in FIG. 15. End 1540 of first converging section 1532 is the entrance of nozzle 1500, and end 1545 of second converging section 1534 is the exit or orifice 1510 of nozzle 1500. From the entrance to orifice 1510 along its length, nozzle 1500 is comprised of first converging section 1532 and second converging section 1534 that abuts or adjoins first converging section 1532. First converging section 1532 has a diameter that decreases in the flow direction of print fluid through nozzle 1500, and second converging section 1534 has a diameter that decreases in the flow direction at a different angle than the first converging section 1532.

Figure 45:
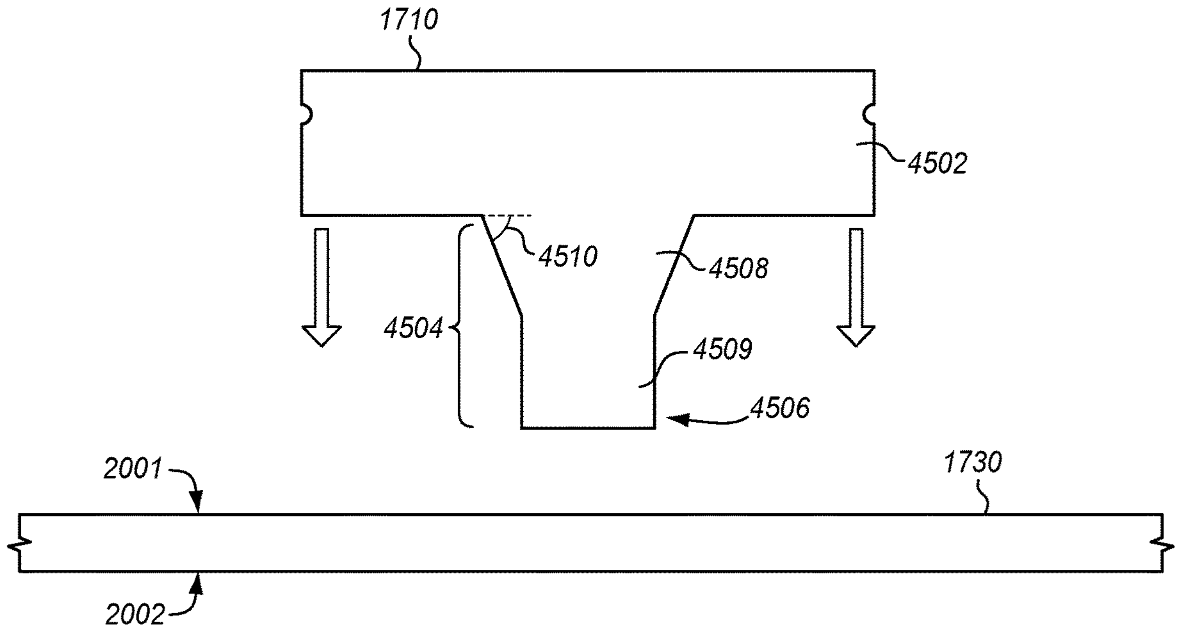
FIG. 45 illustrates a nozzle punch and a nozzle plate in an illustrative embodiment.

In another embodiment, FIGS. 45-55 illustrate fabrication of a nozzle plate stack 1736 where the geometry of the nozzles resembles FIG. 7 described above. A blank nozzle plate 1730 is loaded onto punch press 1702 where nozzle holes 1740 are formed in nozzle plate 1730 with nozzle punch 1710. FIG. 45 illustrates a nozzle punch 1710 and a nozzle plate 1730 in an illustrative embodiment. Nozzle punch 1710 includes a body 4502 that couples to punch holder 1810 of punch press 1702, and a head 4504 that projects from body 4502. Along a length of head 4504 from body 4502 to tip 4506, head 4504 includes a converging portion 4508 and a neck portion 4509. Converging portion 4508 is generally cone-shaped, and converges or tapers toward tip 4506. Thus, the diameter of converging portion 4508 decreases or gets progressively smaller at a convergence angle 4510. Neck portion 4509 is generally cylindrical in shape, and has a constant or uniform diameter. The diameter of neck portion 4509 may correspond with the diameter at an end of converging portion 4508. Although not shown, tip 4506 may include a point, a cutting edge, etc., to facilitate punching a hole in a nozzle plate.

Figure 46:
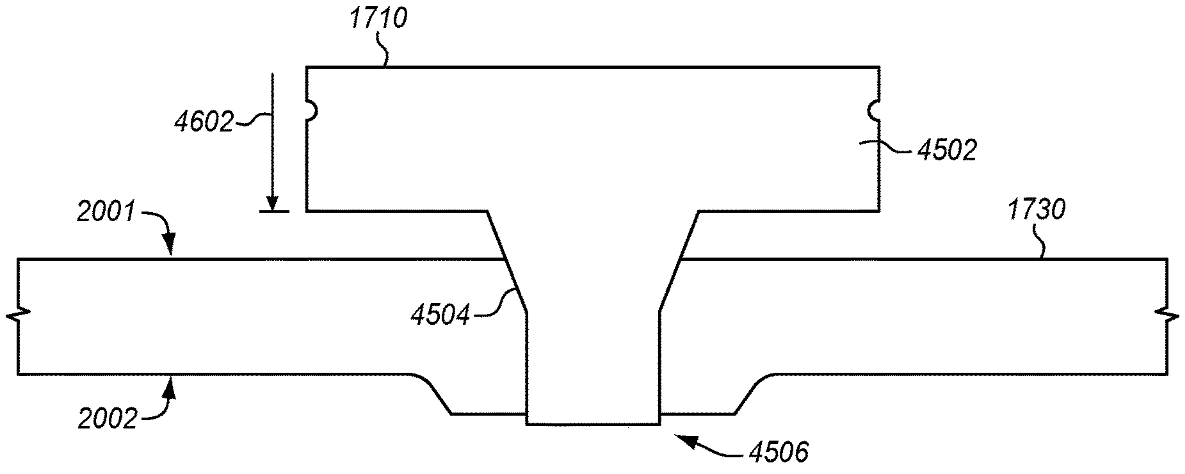
FIG. 46 illustrates a nozzle punch pressed into a nozzle plate in an illustrative embodiment.
Figure 47:
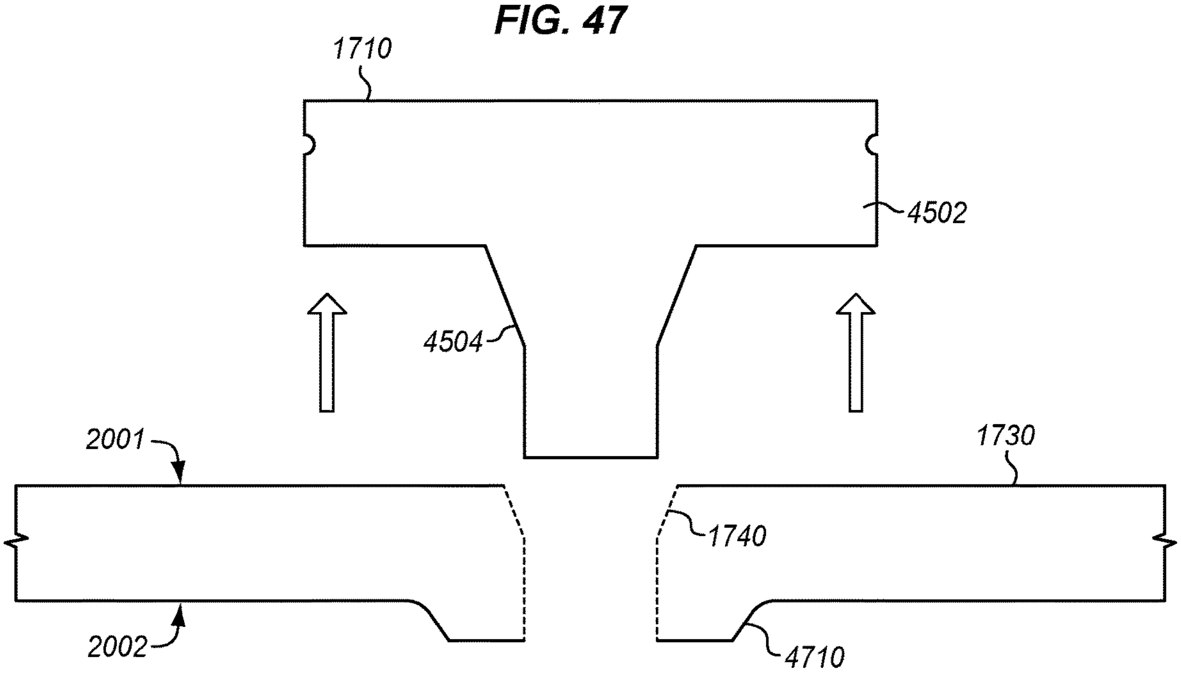
FIG. 47 illustrates a nozzle punch withdrawn from a nozzle plate in an illustrative embodiment.

Punch press 1702 forces nozzle punch 1710 through nozzle plate 1730 from side 2001 to create a nozzle hole 1740. FIG. 46 illustrates nozzle punch 1710 pressed into nozzle plate 1730 in an illustrative embodiment. Punch press 1702 forces the head 4504 of nozzle punch 1710 through nozzle plate 1730 based on a controllable stroke length 4602, with the tip 4506 of nozzle punch 1710 at least partially extending through side 2002 of nozzle plate 1730. Punch press 1702 then withdraws nozzle punch 1710 from nozzle plate 1730. FIG. 47 illustrates nozzle punch 1710 withdrawn from nozzle plate 1730 in an illustrative embodiment. The punching process forms a nozzle hole 1740 through the thickness (T1) of nozzle plate 1730 from side 2001 to side 2002. Punch press 1702 may repeat this process to form a plurality of nozzle holes 1740 in nozzle plate 1730.

Figure 48:
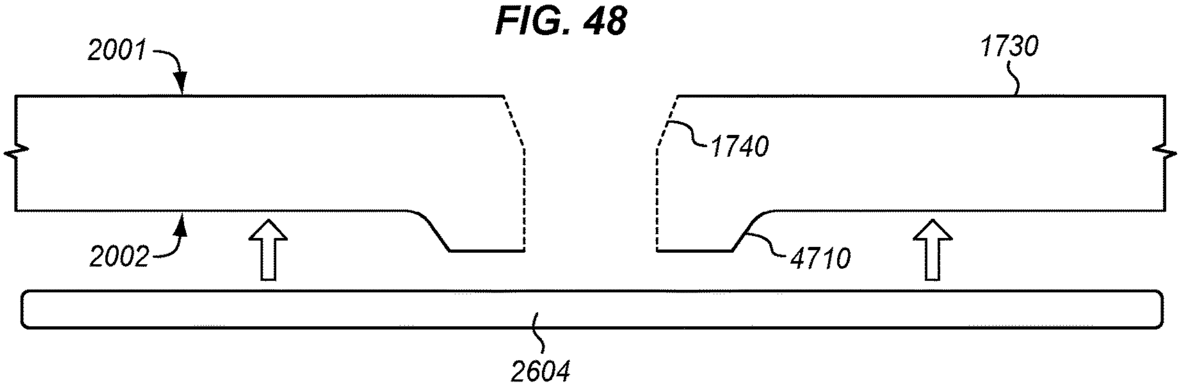
FIG. 48 illustrates polishing of a nozzle plate in an illustrative embodiment.
Figure 49:
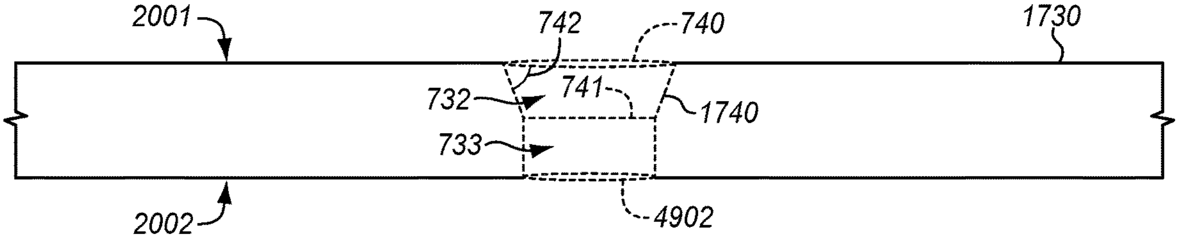
FIG. 49 illustrates a nozzle plate after polishing in an illustrative embodiment.

Punching may result in an extrusion 4710 surrounding a nozzle hole 1740 on side 2002. Side 2002 of nozzle plate 1730 will subsequently be bonded to another nozzle plate, so it may be desirable to form a planar surface on side 2002 with polishing tool 2110. FIG. 48 illustrates polishing of nozzle plate 1730 in an illustrative embodiment. Polishing tool 2110 is represented in FIG. 48 generally by a polishing pad 2604 that polishes side 2002 of nozzle plate 1730. It is noted that polishing tool 2110 may also polish side 2001 of nozzle plate 1730 if desired. FIG. 49 illustrates nozzle plate 1730 after polishing in an illustrative embodiment. Polishing removes extrusion 4710 and forms a planar surface on side 2002 of nozzle plate 1730, and the dimensions of nozzle hole 1740 are defined. As in FIG. 7, nozzle hole 1740 includes a first converging section 732 having a cone shape that tapers or angles from end 740 to end 741 at a convergence angle 742 so that the diameter of first converging section 732 decreases from end 740 to end 741. Nozzle hole 1740 further includes a neck 733 having a constant or uniform diameter. The diameter of neck 733 may correspond with the diameter of first converging section 732 at end 741, and remains uniform along a length of neck 733 to end 4902.

Figure 50:
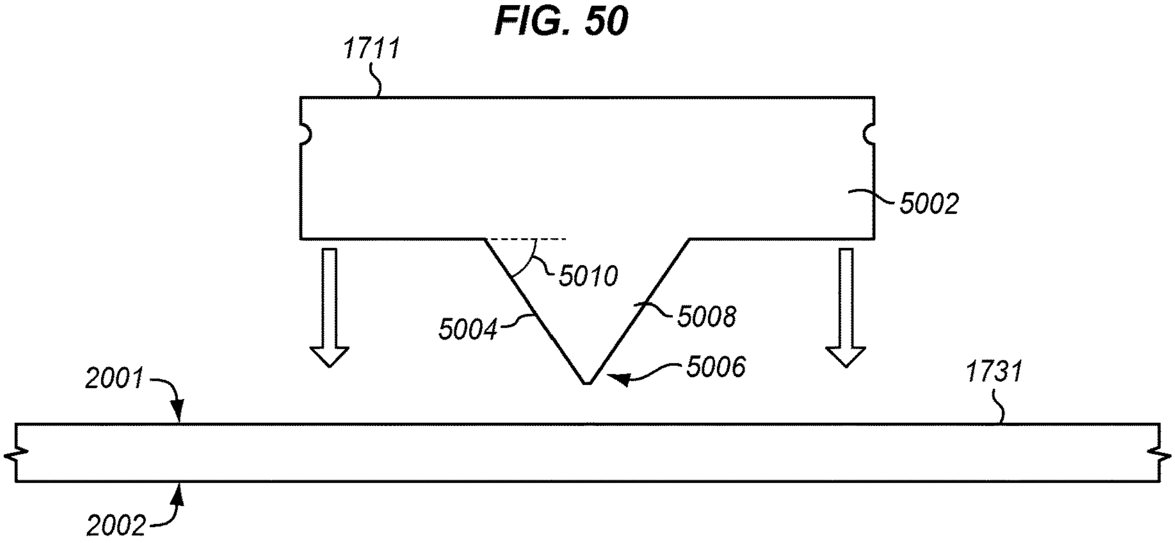
FIG. 50 illustrates a nozzle punch and a nozzle plate in an illustrative embodiment.

A blank nozzle plate 1731 is loaded onto punch press 1702 where nozzle holes 1741 are formed in nozzle plate 1731 with nozzle punch 1711. FIG. 50 illustrates a nozzle punch 1711 and a nozzle plate 1731 in an illustrative embodiment. Nozzle punch 1711 includes a body 5002 that couples to punch holder 1810 of punch press 1702, and a head 5004 that projects from body 5002. Along a length of head 5004 from body 5002 to tip 5006, head 5004 includes a converging portion 5008 that is generally cone-shaped, and converges or tapers toward tip 5006. Thus, the diameter of converging portion 5008 decreases or gets progressively smaller at a convergence angle 5010. In this embodiment, the convergence angle 5010 of the head 5004 of nozzle punch 1711 may be the same, larger, or smaller than the convergence angle 4510 of the head 4504 of nozzle punch 1710 as shown in FIG. 45. Although not shown, tip 5006 may include a point, a cutting edge, etc., to facilitate punching a hole in a nozzle plate.

Figure 51:
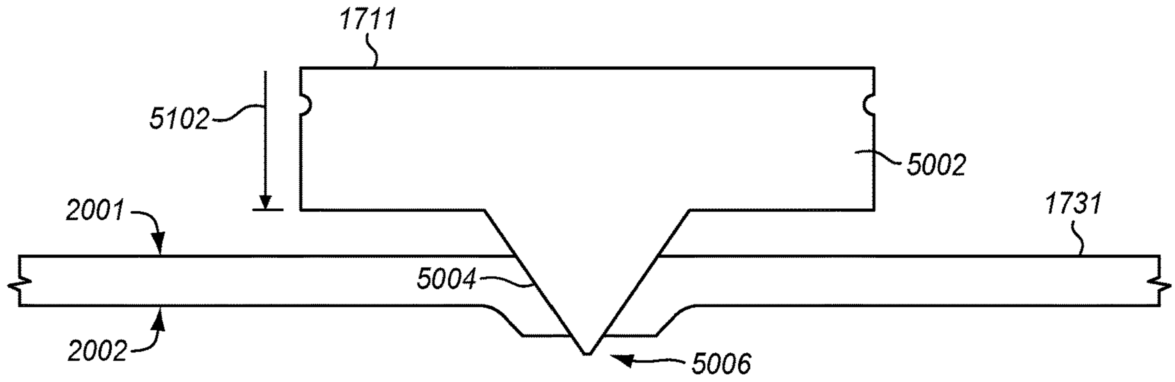
FIG. 51 illustrates a nozzle punch pressed into a nozzle plate in an illustrative embodiment.
Figure 52:
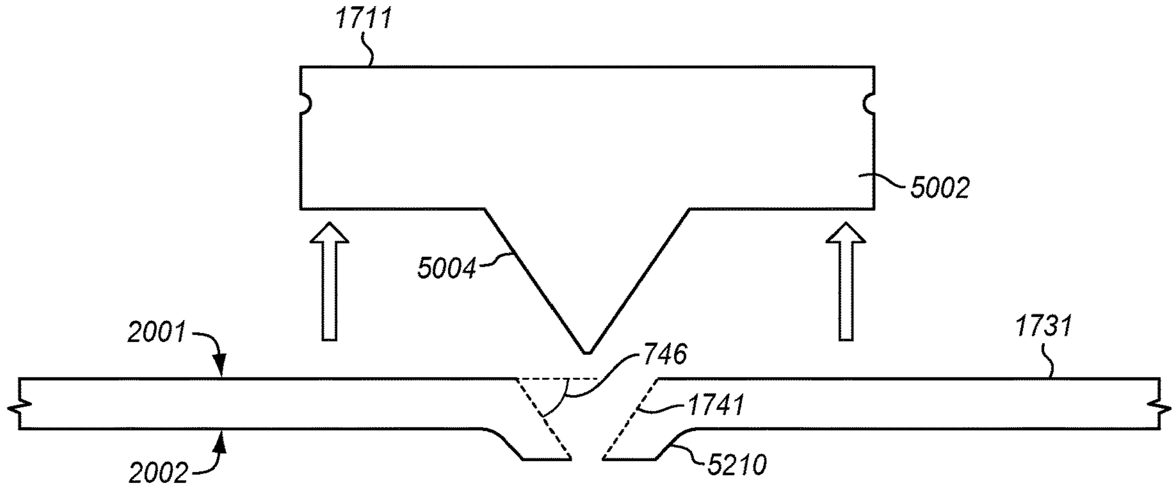
FIG. 52 illustrates a nozzle punch withdrawn from a nozzle plate in an illustrative embodiment.

Punch press 1702 forces nozzle punch 1711 through nozzle plate 1731 from side 2001 to create a nozzle hole 1741. FIG. 51 illustrates nozzle punch 1711 pressed into nozzle plate 1731 in an illustrative embodiment. Punch press 1702 forces the head 5004 of nozzle punch 1711 through nozzle plate 1731 based on a controllable stroke length 5102, with the tip 5006 of nozzle punch 1711 at least partially extending through side 2002 of nozzle plate 1731. Punch press 1702 then withdraws nozzle punch 1711 from nozzle plate 1731. FIG. 52 illustrates nozzle punch 1711 withdrawn from nozzle plate 1731 in an illustrative embodiment. The punching process forms a nozzle hole 1741 through the thickness (T1) of nozzle plate 1731 from side 2001 to side 2002. Nozzle hole 1741 has a convergence angle 746 matching the convergence angle 5010 of head 5004. Punch press 1702 may repeat this process to form a plurality of nozzle holes 1741 in nozzle plate 1731.

Figure 53:
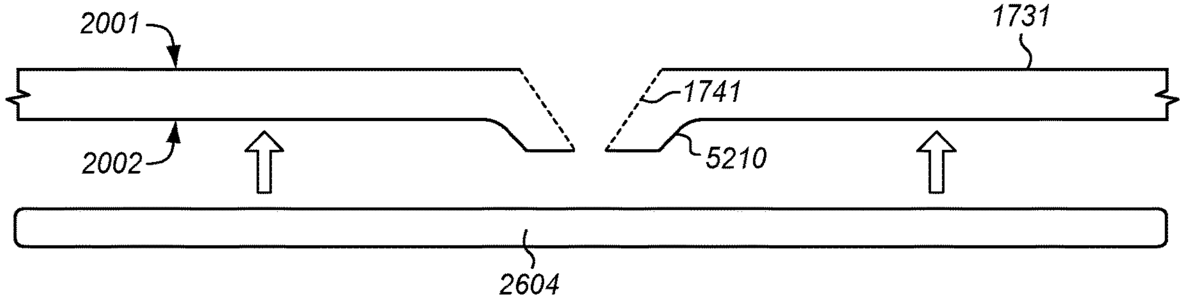
FIG. 53 illustrates polishing of a nozzle plate in an illustrative embodiment.
Figure 54:
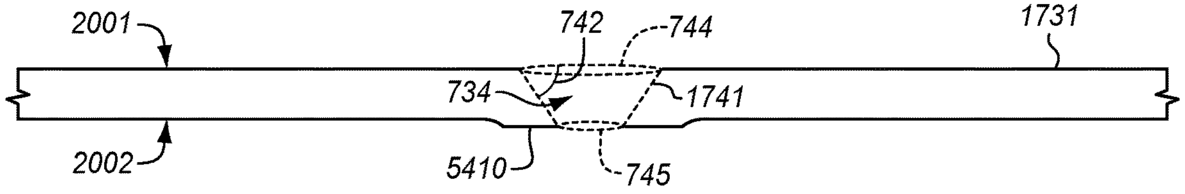
FIG. 54 illustrates a nozzle plate after polishing in an illustrative embodiment.

Punching may result in an extrusion 5210 surrounding nozzle hole 1741 on side 2002. Side 2002 of nozzle plate 1731 represents the discharge surface of a printhead where a print fluid is jetted out of the printhead. Thus, side 2002 of nozzle plate 1731 may be polished to define the orifice of a nozzle. FIG. 53 illustrates polishing of nozzle plate 1731 in an illustrative embodiment. Polishing tool 2110 is represented in FIG. 53 generally by a polishing pad 2604 that polishes side 2002 of nozzle plate 1731. It is noted that polishing tool 2110 may also polish side 2001 of nozzle plate 1731 if desired. FIG. 54 illustrates nozzle plate 1731 after polishing in an illustrative embodiment. After polishing in this embodiment, a portion of extrusion 5210 is removed, leaving a surface feature 5410 that projects from side 2002 around nozzle hole 1741. Polishing defines the orifice of the nozzle where a print fluid exits the nozzle at an end of nozzle hole 1741. Nozzle hole 1741 includes a second converging section 734 having a cone shape that tapers or angles from end 744 to end 745 so that the diameter of second converging section 734 decreases from end 744 to end 745. The diameter of second converging section 734 at end 744 is generally the same as or equivalent to the diameter of neck 733 (see FIG. 49). The diameter of second converging section 734 at end 745 defines the orifice of a nozzle, which is circular.

Figure 55:
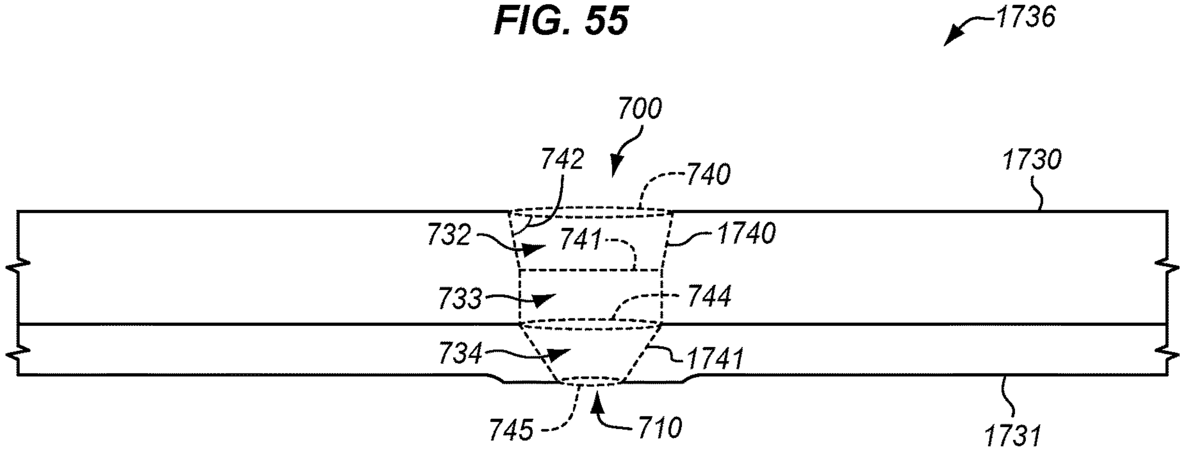
FIG. 55 illustrates a nozzle plate stack in an illustrative embodiment.

With nozzle plates 1730-1731 punched and polished as desired, nozzle plates 1730-1731 may be loaded onto bonding tool 1704, which bonds the nozzle plates 1730-1731 to form a nozzle plate stack 1736. FIG. 55 illustrates a nozzle plate stack 1736 in an illustrative embodiment. When bonded, nozzle hole 1740 of nozzle plate 1730 and nozzle hole 1741 of nozzle plate 1731 define a nozzle 700 of a printhead as shown in FIG. 7. End 740 of first converging section 732 is the entrance of nozzle 700, and end 745 of second converging section 734 is the exit or orifice 710 of nozzle 700. From the entrance to orifice 710 along its length, nozzle 700 is comprised of first converging section 732, a neck 733 that abuts or adjoins first converging section 732, and second converging section 734 that abuts or adjoins neck 733. First converging section 732 has a diameter that decreases in the flow direction of print fluid through nozzle 700, neck 733 has a uniform diameter in the flow direction of print fluid through nozzle 700, and second converging section 734 has a diameter that decreases in the flow direction of print fluid through nozzle 700.

The above embodiment described forming the first converging section 732, neck 733, and the second converging section 734 for nozzle 700 by punching two nozzle plates 730-731. In other embodiments, more nozzle plates may be punched to form nozzle 700. For example, first converging section 732 may be formed by punching a first nozzle plate with a first nozzle punch, neck 733 may be formed by punching a second nozzle plate with a second nozzle punch (i.e., a nozzle punch with a cylindrical head), and second converging section 734 may be formed by punching a third nozzle plate with a third nozzle punch.

Figure 56:
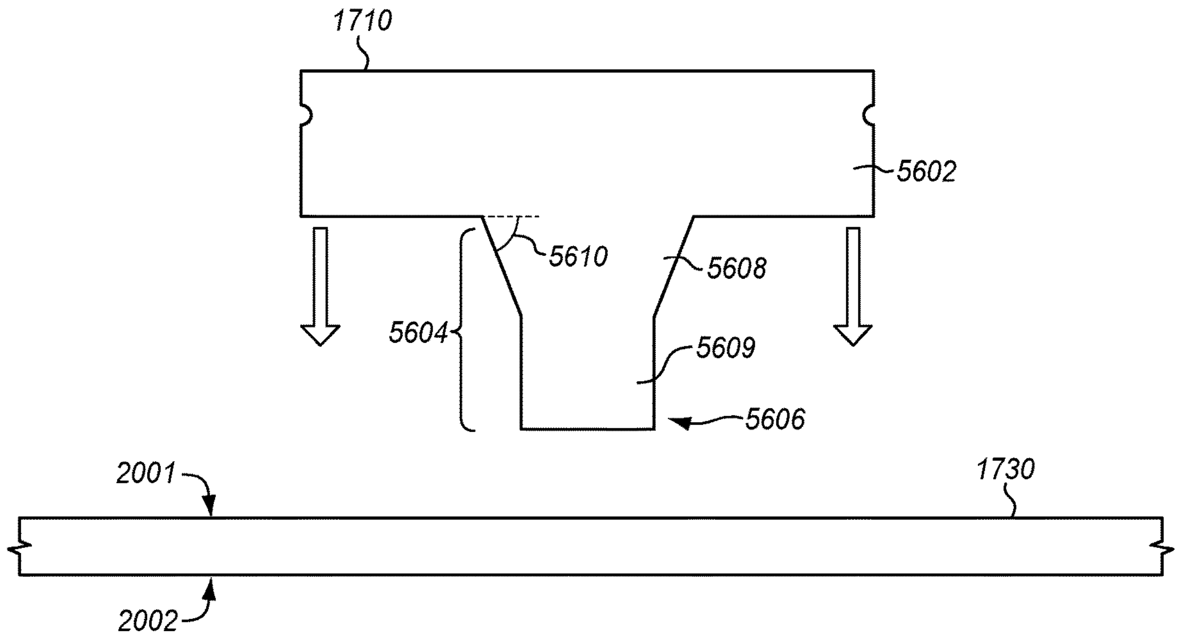
FIG. 56 illustrates a nozzle punch and a nozzle plate in an illustrative embodiment.

In another embodiment, FIGS. 56-66 illustrate fabrication of a nozzle plate stack 1736 where the geometry of the nozzles resembles FIG. 10 described above. A blank nozzle plate 1730 is loaded onto punch press 1702 where nozzle holes 1740 are formed in nozzle plate 1730 with nozzle punch 1710. FIG. 56 illustrates a nozzle punch 1710 and a nozzle plate 1730 in an illustrative embodiment. Nozzle punch 1710 includes a body 5602 that couples to punch holder 1810 of punch press 1702, and a head 5604 that projects from body 5602. Along a length of head 5604 from body 5602 to tip 5606, head 5604 includes a converging portion 5608 and a neck portion 5609. Converging portion 5608 is generally cone-shaped, and converges or tapers toward tip 5606. Thus, the diameter of converging portion 5608 decreases or gets progressively smaller at a convergence angle 5610. Neck portion 5609 is generally cylindrical in shape, and has a constant or uniform diameter. The diameter of neck portion 5609 may correspond with the diameter at an end of converging portion 5608. Although not shown, tip 5606 may include a point, a cutting edge, etc., to facilitate punching a hole in a nozzle plate.

Figure 57:
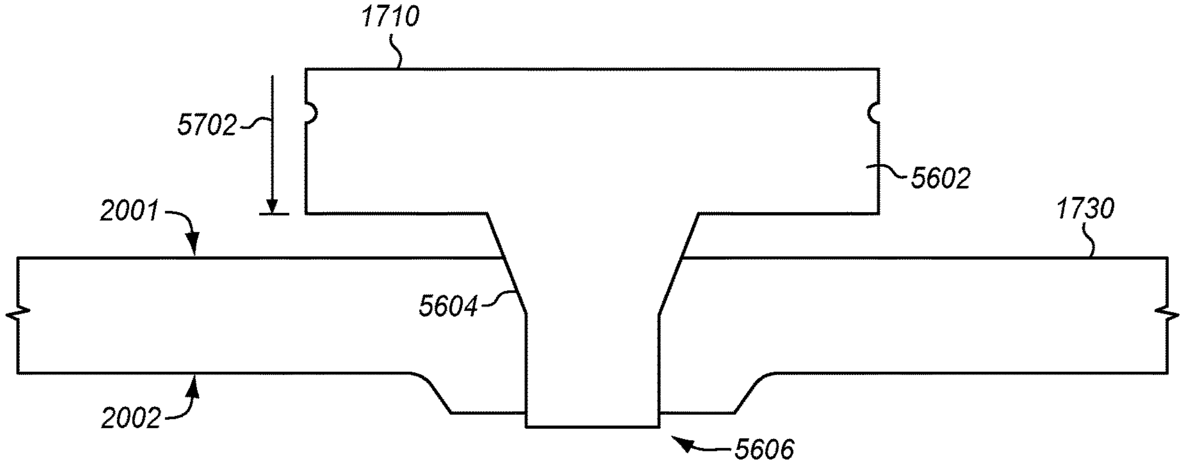
FIG. 57 illustrates a nozzle punch pressed into a nozzle plate in an illustrative embodiment.
Figure 58:
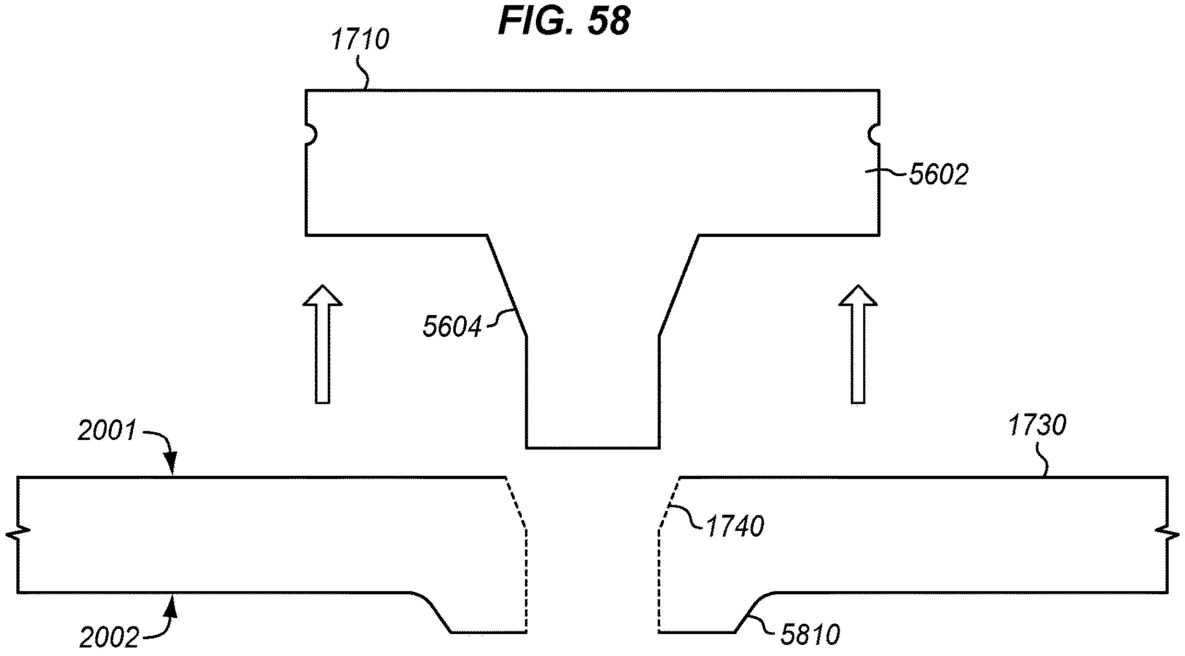
FIG. 58 illustrates a nozzle punch withdrawn from a nozzle plate in an illustrative embodiment.

Punch press 1702 forces nozzle punch 1710 through nozzle plate 1730 from side 2001 to create a nozzle hole 1740. FIG. 57 illustrates nozzle punch 1710 pressed into nozzle plate 1730 in an illustrative embodiment. Punch press 1702 forces the head 5604 of nozzle punch 1710 through nozzle plate 1730 based on a controllable stroke length 5702, with the tip 5606 of nozzle punch 1710 at least partially extending through side 2002 of nozzle plate 1730. Punch press 1702 then withdraws nozzle punch 1710 from nozzle plate 1730. FIG. 58 illustrates nozzle punch 1710 withdrawn from nozzle plate 1730 in an illustrative embodiment. The punching process forms a nozzle hole 1740 through the thickness (T1) of nozzle plate 1730 from side 2001 to side 2002. Punch press 1702 may repeat this process to form a plurality of nozzle holes 1740 in nozzle plate 1730.

Figure 59:
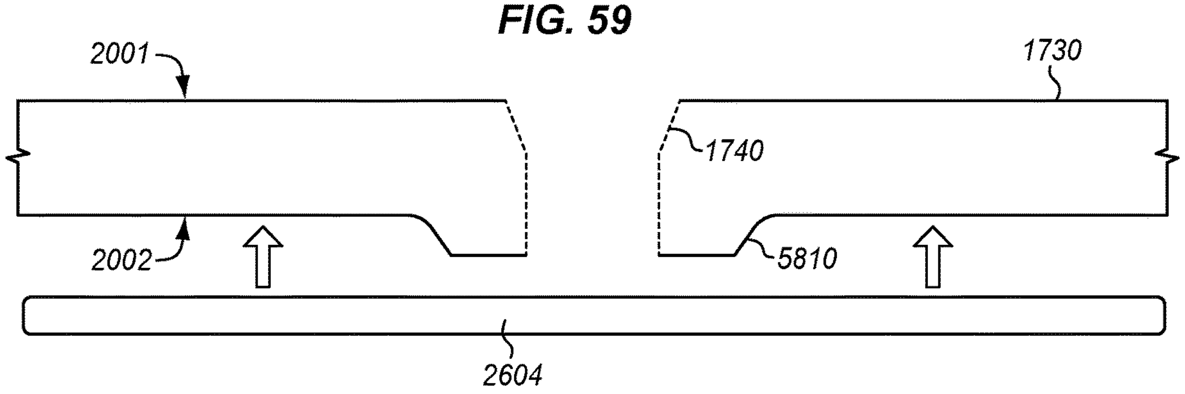
FIG. 59 illustrates polishing of a nozzle plate in an illustrative embodiment.
Figure 60:
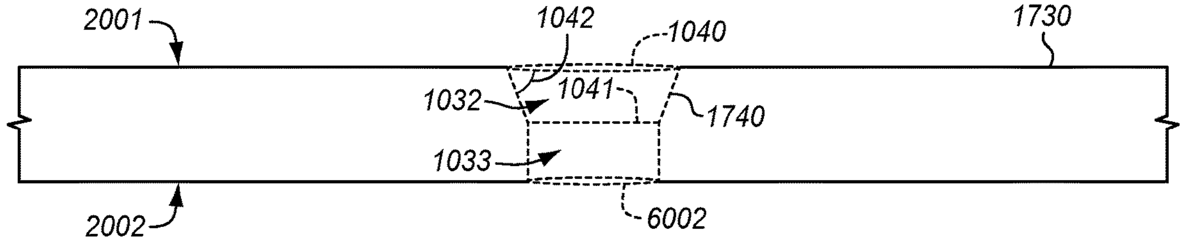
FIG. 60 illustrates a nozzle plate after polishing in an illustrative embodiment.

Punching may result in an extrusion 5810 surrounding a nozzle hole 1740 on side 2002. Side 2002 of nozzle plate 1730 will subsequently be bonded to another nozzle plate, so it may be desirable to form a planar surface on side 2002 with polishing tool 2110. FIG. 59 illustrates polishing of nozzle plate 1730 in an illustrative embodiment. Polishing tool 2110 is represented in FIG. 59 generally by a polishing pad 2604 that polishes side 2002 of nozzle plate 1730. It is noted that polishing tool 2110 may also polish side 2001 of nozzle plate 1730 if desired. FIG. 60 illustrates nozzle plate 1730 after polishing in an illustrative embodiment. Polishing removes extrusion 5810 and forms a planar surface on side 2002 of nozzle plate 1730, and the dimensions of nozzle hole 1740 are defined. As in FIG. 10, nozzle hole 1740 includes a first converging section 1032 having a cone shape that tapers or angles from end 1040 to end 1041 at a convergence angle 1042 so that the diameter of first converging section 1032 decreases from end 1040 to end 1041. Nozzle hole 1740 further includes a neck 1033 having a constant or uniform diameter. The diameter of neck 1033 may correspond with the diameter of first converging section 1032 at end 1041, and remains uniform along a length of neck 1033 to end 6002.

Figure 61:
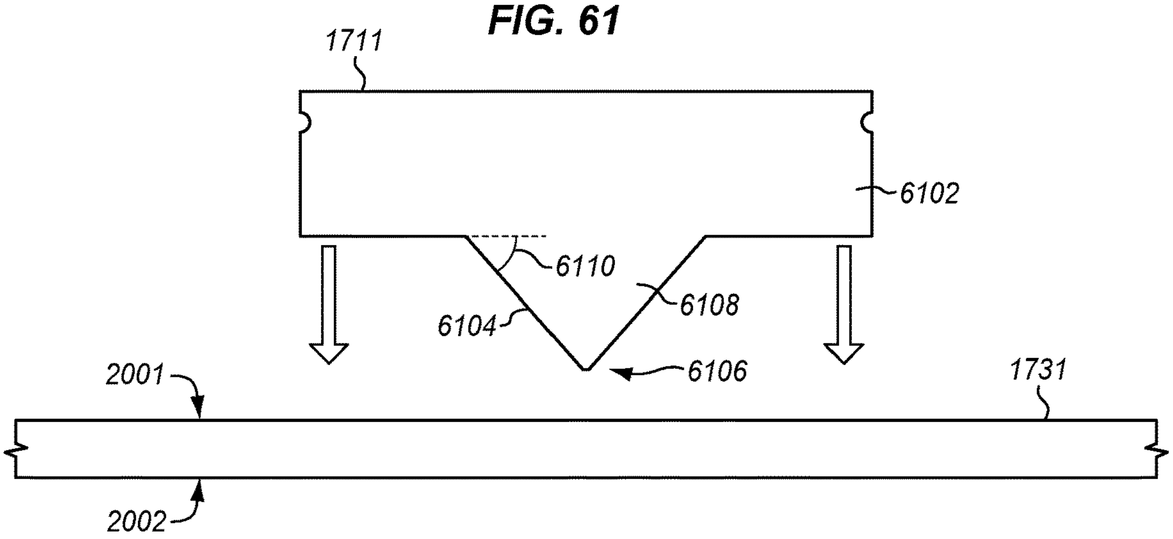
FIG. 61 illustrates a nozzle punch and a nozzle plate in an illustrative embodiment.

A blank nozzle plate 1731 is loaded onto punch press 1702 where nozzle holes 1741 are formed in nozzle plate 1731 with nozzle punch 1711. FIG. 61 illustrates a nozzle punch 1711 and a nozzle plate 1731 in an illustrative embodiment. Nozzle punch 1711 includes a body 6102 that couples to punch holder 1810 of punch press 1702, and a head 6104 that projects from body 6102. Along a length of head 6104 from body 6102 to tip 6106, head 6104 includes a converging portion 6108 that is generally cone-shaped, and converges or tapers toward tip 6106. Thus, the diameter of converging portion 6108 decreases or gets progressively smaller at a convergence angle 6110. In this embodiment, the convergence angle 6110 of the head 6104 of nozzle punch 1711 may be the same, larger, or smaller than the convergence angle 5610 of the head 5604 of nozzle punch 1710 as shown in FIG. 56. Although not shown, tip 6106 may include a point, a cutting edge, etc., to facilitate punching a hole in a nozzle plate.

Figure 62:
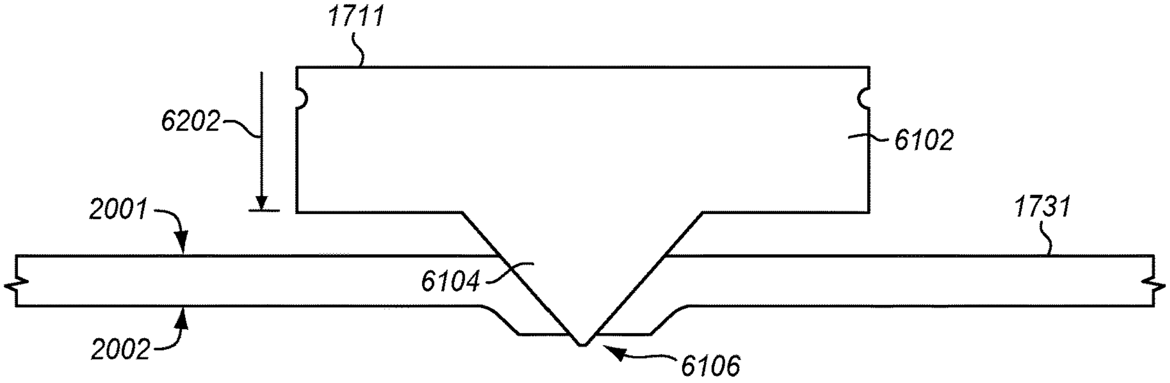
FIG. 62 illustrates a nozzle punch pressed into a nozzle plate in an illustrative embodiment.
Figure 63:
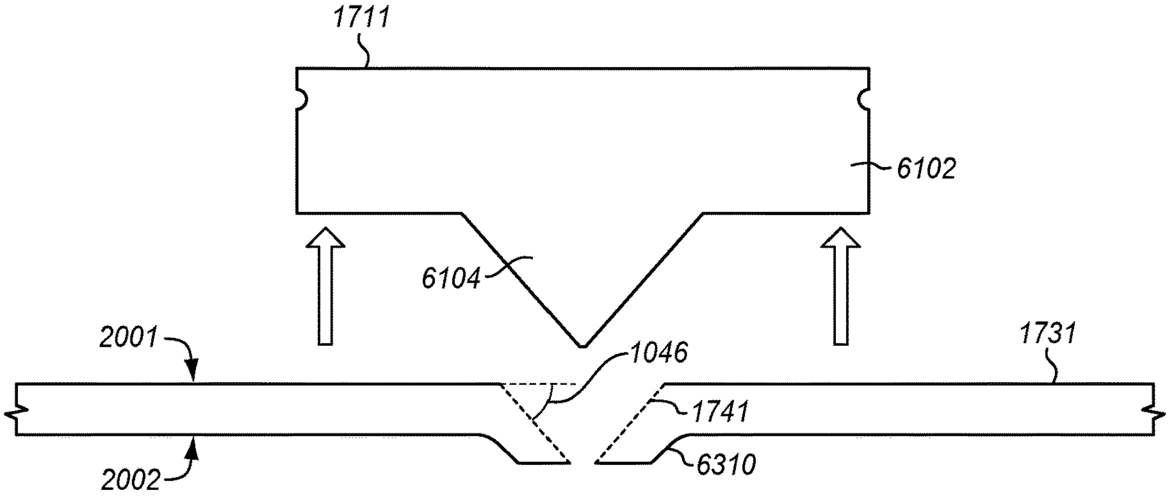
FIG. 63 illustrates a nozzle punch withdrawn from a nozzle plate in an illustrative embodiment.

Punch press 1702 forces nozzle punch 1711 through nozzle plate 1731 from side 2001 to create a nozzle hole 1741. FIG. 62 illustrates nozzle punch 1711 pressed into nozzle plate 1731 in an illustrative embodiment. Punch press 1702 forces the head 6104 of nozzle punch 1711 through nozzle plate 1731 based on a controllable stroke length 6202, with the tip 6106 of nozzle punch 1711 at least partially extending through side 2002 of nozzle plate 1731. Punch press 1702 then withdraws nozzle punch 1711 from nozzle plate 1731. FIG. 63 illustrates nozzle punch 1711 withdrawn from nozzle plate 1731 in an illustrative embodiment. The punching process forms a nozzle hole 1741 through the thickness (T1) of nozzle plate 1731 from side 2001 to side 2002. Nozzle hole 1741 has a convergence angle 1046 matching the convergence angle 6110 of head 6104. Punch press 1702 may repeat this process to form a plurality of nozzle holes 1741 in nozzle plate 1731.

Figure 64:
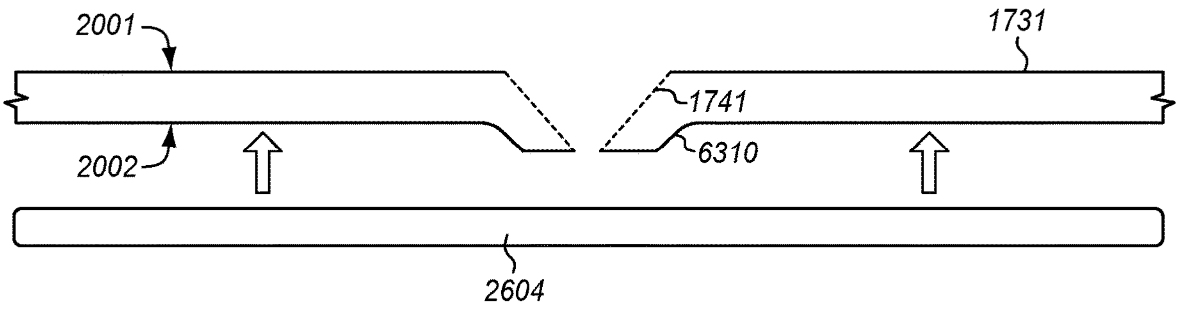
FIG. 64 illustrates polishing of a nozzle plate in an illustrative embodiment.
Figure 65:
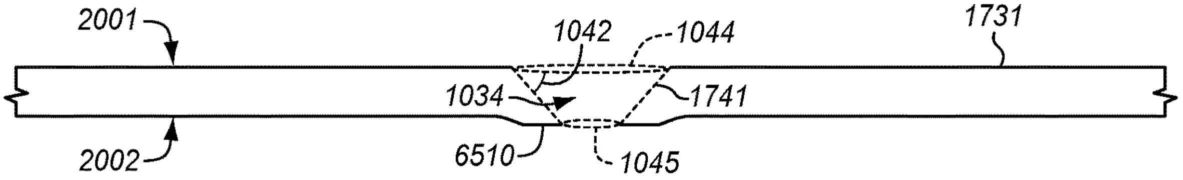
FIG. 65 illustrates a nozzle plate after polishing in an illustrative embodiment.

Punching may result in an extrusion 6310 surrounding nozzle hole 1741 on side 2002. Side 2002 of nozzle plate 1731 represents the discharge surface of a printhead where a print fluid is jetted out of the printhead. Thus, side 2002 of nozzle plate 1731 may be polished to define the orifice of a nozzle. FIG. 64 illustrates polishing of nozzle plate 1731 in an illustrative embodiment. Polishing tool 2110 is represented in FIG. 64 generally by a polishing pad 2604 that polishes side 2002 of nozzle plate 1731. It is noted that polishing tool 2110 may also polish side 2001 of nozzle plate 1731 if desired. FIG. 65 illustrates nozzle plate 1731 after polishing in an illustrative embodiment. After polishing in this embodiment, a portion of extrusion 6310 is removed, leaving a surface feature 6510 that projects from side 2002 around the nozzle hole 1741. Polishing defines the orifice of the nozzle where a print fluid exits the nozzle at an end of nozzle hole 1741. Nozzle hole 1741 includes a second converging section 1034 having a cone shape that tapers or angles from end 1044 to end 1045 so that the diameter of second converging section 1034 decreases from end 1044 to end 1045. The diameter of second converging section 1034 at end 1044 is larger than the diameter of neck 1033 (see FIG. 60). The diameter of second converging section 1034 at end 1045 defines the orifice of a nozzle, which is circular.

Figure 66:
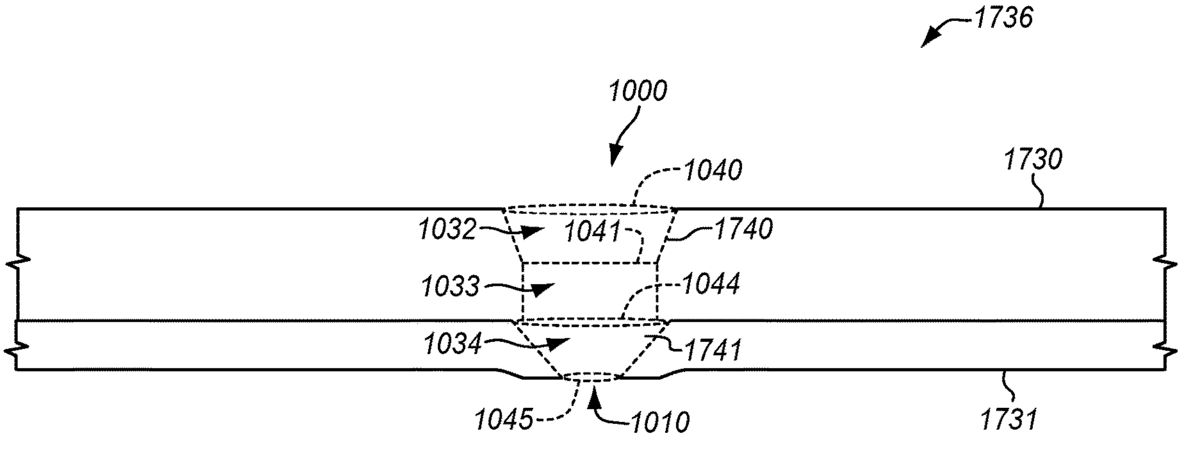
FIG. 66 illustrates a nozzle plate stack in an illustrative embodiment.

With nozzle plates 1730-1731 punched and polished as desired, nozzle plates 1730-1731 may be loaded onto bonding tool 1704, which bonds the nozzle plates 1730-1731 to form a nozzle plate stack 1736. FIG. 66 illustrates a nozzle plate stack 1736 in an illustrative embodiment. When bonded, nozzle hole 1740 of nozzle plate 1730 and nozzle hole 1741 of nozzle plate 1731 define a nozzle 1000 of a printhead as shown in FIG. 10. End 1040 of first converging section 1032 is the entrance of nozzle 1000, and end 1045 of second converging section 1034 is the exit or orifice 1010 of nozzle 1000. From the entrance to orifice 1010 along its length, nozzle 1000 is comprised of first converging section 1032, a neck 1033 that abuts or adjoins first converging section 1032, and second converging section 1034 that abuts or adjoins neck 1033. First converging section 1032 has a diameter that decreases in the flow direction of print fluid through nozzle 1000, neck 1033 has a uniform diameter in the flow direction of print fluid through nozzle 1000, and second converging section 1034 has a diameter that decreases in the flow direction of print fluid through nozzle 1000.

The above embodiment described forming the first converging section 1032, neck 1033, and the second converging section 1034 for nozzle 1000 by punching two nozzle plates 730-731. In other embodiments, more nozzle plates may be punched to form nozzle 1000. For example, first converging section 1032 may be formed by punching a first nozzle plate with a first nozzle punch, neck 1033 may be formed by punching a second nozzle plate with a second nozzle punch (i.e., a nozzle punch with a cylindrical head), and second converging section 1034 may be formed by punching a third nozzle plate with a third nozzle punch.

Although specific embodiments were described herein, the scope of the invention is not limited to those specific embodiments. The scope of the invention is defined by the following claims and any equivalents thereof.

What is claimed is:

1. A method of fabricating a printhead, the method comprising:

punching first nozzle holes in a first nozzle plate with a first punch of at least one punch press, wherein each of the first nozzle holes includes a first converging section;

punching second nozzle holes in a second nozzle plate with a second punch of the at least one punch press, wherein each of the second nozzle holes includes a second converging section; and bonding the first nozzle plate to the second nozzle plate with a bonding tool to form a nozzle plate stack, wherein the first nozzle holes and the second nozzle holes define nozzles of the printhead.

2. The method of claim 1 wherein:

the first nozzle holes are punched from a first side through a second side of the first nozzle plate; and the method further comprises:

polishing the second side of the first nozzle plate with a polishing tool to form a planar surface on the second side of the first nozzle plate prior to the bonding.

3. The method of claim 1 wherein:

the second nozzle holes are punched from a first side through a second side of the second nozzle plate forming extrusions around the second nozzle holes on the second side of the second nozzle plate; and the method further comprises:

polishing the second side of the second nozzle plate with a polishing tool to remove a portion of the extrusions and leave surface features around the second nozzle holes that define orifices of the nozzles where a print fluid exits the nozzles.

4. The method of claim 1 wherein:

a first convergence angle of the first converging section is greater than a second convergence angle of the second converging section.

5. The method of claim 1 wherein:

a first convergence angle of the first converging section is less than a second convergence angle of the second converging section.

6. The method of claim 1 wherein:

each of the first nozzle holes in the first nozzle plate includes the first converging section, and a neck adjoining the first converging section having a diameter that is uniform.

7. The method of claim 6 wherein:

the second converging section converges from a first side to a second side of the second nozzle plate; and a diameter of the second converging section at the first side of the second nozzle plate is equivalent to the diameter of the neck.

8. The method of claim 6 wherein:

the second converging section converges from a first side to a second side of the second nozzle plate; and a diameter of the second converging section at the first side of the second nozzle plate is greater than the diameter of the neck.

9. A fabrication system for a printhead, the fabrication system comprising:

at least one punch press configured to punch first nozzle holes in a first nozzle plate with a first punch, wherein each of the first nozzle holes includes a first converging section;

the at least one punch press is further configured to punch second nozzle holes in a second nozzle plate with a second punch, wherein each of the second nozzle holes includes a second converging section; and a bonding tool configured to bond the first nozzle plate to the second nozzle plate to form a nozzle plate stack, wherein the first nozzle holes and the second nozzle holes define nozzles of the printhead.

10. The fabrication system of claim 9 wherein:

the at least one punch press is configured to punch the first nozzle holes from a first side through a second side of the first nozzle plate; and the fabrication system further comprises:

a polishing tool configured to polish the second side of the first nozzle plate to form a planar surface on the second side of the first nozzle plate prior to bonding by the bonding tool.

11. The fabrication system of claim 9 wherein:

the at least one punch press is configured to punch the second nozzle holes from a first side through a second side of the second nozzle plate forming extrusions around the second nozzle holes on the second side of the second nozzle plate; and the fabrication system further comprises:

a polishing tool configured to polish the second side of the second nozzle plate to remove a portion of the extrusions and leave surface features around the second nozzle holes that define orifices of the nozzles where a print fluid exits the nozzles.

12. The fabrication system of claim 9 wherein:

a first convergence angle of the first converging section is greater than a second convergence angle of the second converging section.

13. The fabrication system of claim 9 wherein:

a first convergence angle of the first converging section is less than a second convergence angle of the second converging section.

14. The fabrication system of claim 9 wherein:

each of the first nozzle holes in the first nozzle plate includes the first converging section, and a neck adjoining the first converging section having a diameter that is uniform.

15. The fabrication system of claim 14 wherein:

the second converging section converges from a first side to a second side of the second nozzle plate; and a diameter of the second converging section at the first side of the second nozzle plate is equivalent to the diameter of the neck.

16. The fabrication system of claim 14 wherein:

the second converging section converges from a first side to a second side of the second nozzle plate; and a diameter of the second converging section at the first side of the second nozzle plate is greater than the diameter of the neck.

17. A non-transitory computer readable medium embodying programmed instructions executed by a processor, wherein the instructions direct the processor to implement a method of fabricating a printhead, the method comprising:

controlling at least one punch press to punch first nozzle holes in a first nozzle plate with a first punch, wherein each of the first nozzle holes includes a first converging section;

controlling the at least one punch press to punch second nozzle holes in a second nozzle plate with a second punch, wherein each of the second nozzle holes includes a second converging section; and controlling a bonding tool to bond the first nozzle plate and the second nozzle plate to form a nozzle plate stack, wherein the first nozzle holes and the second nozzle holes define nozzles of the printhead.

18. The computer readable medium of claim 17 wherein:

the first nozzle holes are punched from a first side through a second side of the first nozzle plate; and the method further comprises:

controlling a polishing tool to polish the second side of the first nozzle plate to form a planar surface on the second side of the first nozzle plate prior to the bonding.

19. The computer readable medium of claim 17 wherein:

the second nozzle holes are punched from a first side through a second side of the second nozzle plate forming extrusions around the second nozzle holes on the second side of the second nozzle plate; and the method further comprises:

controlling a polishing tool to polish the second side of the second nozzle plate to remove a portion of the extrusions and leave surface features around the second nozzle holes that define orifices of the nozzles where a print fluid exits the nozzles.

20. The computer readable medium of claim 17 wherein:

each of the first nozzle holes in the first nozzle plate includes the first converging section, and a neck adjoining the first converging section having a diameter that is uniform.

* * * * *